(12) United States Patent
Huang et al.

(10) Patent No.: US 12,199,917 B2
(45) Date of Patent: Jan. 14, 2025

(54) FEEDBACK TECHNIQUES IN WIRELESS COMMUNICATIONS

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 17/586,209

(22) Filed: Jan. 27, 2022

(65) Prior Publication Data

US 2022/0247541 A1   Aug. 4, 2022

Related U.S. Application Data

(60) Provisional application No. 63/143,822, filed on Jan. 30, 2021.

(51) Int. Cl.
*H04L 5/00*    (2006.01)
*H04L 1/1829*  (2023.01)
*H04W 72/21*   (2023.01)

(52) U.S. Cl.
CPC .......... *H04L 5/0055* (2013.01); *H04L 1/1854* (2013.01); *H04L 1/1858* (2013.01); *H04W 72/21* (2023.01)

(58) Field of Classification Search
CPC ... H04L 5/0055; H04L 1/1854; H04L 1/1858; H04W 72/21
USPC ........................................................ 370/329
See application file for complete search history.

(56) References Cited

U.S. PATENT DOCUMENTS

2012/0076077 A1\* 3/2012 Buckley ................ H04L 5/0055
                                                    370/328
2016/0233999 A1\* 8/2016 Chendamarai Kannan .................
                                                    H04W 72/20
2018/0302128 A1\* 10/2018 Akkarakaran ....... H04B 7/0421

FOREIGN PATENT DOCUMENTS

WO   WO-2015077964 A1   6/2015

OTHER PUBLICATIONS

International Search Report and Written Opinion—PCT/US2022/070414—ISA/EPO—Apr. 26, 2022.

(Continued)

*Primary Examiner* — Nicholas R Taylor
*Assistant Examiner* — Chong G Kim
(74) *Attorney, Agent, or Firm* — Holland & Hart LLP

(57) ABSTRACT

Methods, systems, and devices for wireless communications are described in which a user equipment (UE) may provide a feedback message to a base station that includes a feedback report that indicates successful or unsuccessful receipt of multiple downlink transmissions, and also includes an indication of a number of unsuccessful receipts that are due to unsuccessful receipt of data channel communications. The indication of the number of unsuccessful receipts of data channel transmissions may be provided as a binary representation of the total number, or may be provided as a quantized value in which each quantized point is associated with a certain number of unsuccessfully received data channel transmissions.

30 Claims, 18 Drawing Sheets

(56) References Cited

OTHER PUBLICATIONS

Qualcomm Incorporated: "CSI Enhancement for IOT and URLLC", 3GPP Draft, 3GPP TSG RAN WG1 #103-e, R1-2009258, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946921, 17 Pages, Retrieved from the Internet: URL: https://ftp.3gpp.org/tsg_ran/WG1_RL1/TSGR1_103-e/Docs/R1-2009258.zip. R1-2009258 CSI Enhancement for IOT and URLLC.docx [Retrieved on Oct. 24, 2020] Section 5.2.

Qualcomm Incorporated, et al., "CSI Enhancement for IOT and URLLC", 3GPP Draft, 3GPP TSG RAN WG1 #106bis-e, R1-2110179, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021 (Oct. 2, 2021), XP052059115, 3 Pages, Retrieved from the Internet: URL: https://ftp.3gpp.org/tsg_ran/WG1_RL1/TSGR1_106b-e/Docs/R1-2110179.zip R1-2110179 CSI Enhancement for IOT and URLLC.docx [Retrieved on Oct. 2, 2021] Sections 2, 3.

* cited by examiner

FEEDBACK TECHNIQUES IN WIRELESS COMMUNICATIONS

CROSS REFERENCE

The present application for patent claims the benefit of U.S. Provisional Patent Application No. 63/143,822 by HUANG et al., entitled "FEEDBACK TECHNIQUES IN WIRELESS COMMUNICATIONS," filed Jan. 30, 2021, assigned to the assignee hereof, and expressly incorporated by reference herein.

FIELD OF TECHNOLOGY

The present disclosure relates to wireless communications, including feedback techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs and base stations may exchange feedback information that indicates whether a communication has been successfully received at the device. For example, a UE may transmit hybrid automatic repeat request (HARQ) feedback that indicates whether one or more downlink transmissions from a base station have been successfully received. Such feedback information may include, for example, an acknowledgment (ACK) indication for a successfully received transmission, and a negative acknowledgment (NACK) indication for an unsuccessfully received transmission. A base station, upon receiving the feedback, may retransmit one or more downlink transmissions that have a NACK indication, and the UE may attempt to decode the retransmitted communication. Efficient techniques for communicating feedback information are desirable to help to further enhance the efficiency and reliability of wireless communications.

SUMMARY

The described techniques relate to improved methods, systems, devices, and apparatuses that support feedback techniques in wireless communications. In accordance with various aspects, feedback may be provided that indicates whether one or more communications are successfully or unsuccessfully received and that also indicates, in cases of unsuccessful receipts, information related to a number of such unsuccessful receptions that are the result of unsuccessful control channel or data channel receptions. In some cases, a user equipment (UE) may receive control information via a control channel (e.g., a physical downlink control channel (PDCCH)) that provides scheduling information for a data channel (e.g., a physical downlink shared channel (PDSCH)) communication that includes data for the UE. Based on the control channel information, the UE may receive and decode the data channel communication. If the UE successfully decodes the data channel communication, the UE may provide an acknowledgment (ACK) feedback to the base station associated with that particular communication. If the UE is not able to successfully decode the control channel communication, the data channel may not be received because the UE is unaware of the scheduling information, and the UE may report a negative acknowledgment (NACK) for that particular communication. Such a NACK may be referred to herein as a "dummy NACK" because it is related to the control channel versus the data channel. In cases where the UE does receive the control channel communication but is unable to successfully decode the scheduled data channel communication, the UE may also report a NACK, which may be referred to herein as a "true NACK" because it is related to the data channel communication.

In accordance with various techniques as discussed herein, a UE may provide a feedback message to a base station that includes a feedback report with multiple ACK/NACK indications for multiple downlink transmissions. The feedback message may also include an indication of a number of NACKs that are due to unsuccessful receipt of data channel communications (e.g., a number of true NACKs). The base station may receive the feedback message, and prepare one or more retransmissions for one or more downlink transmissions for which a NACK is reported. In some cases, the indication of the number of NACKs that are due to unsuccessful receipt of data channel transmissions may be provided as a binary representation of the total number of such NACKs, or may be provided as a quantized value in which each quantized point is associated with a certain number of such NACKs. In some cases, based on the indication of the number of NACKs associated with data channel transmissions, the base station may modify one or more transmission parameters for the control channel, for the data channel, or combinations thereof. For example, the base station may determine that the control channel is experiencing a relatively high rate of NACKs, and may adjust one or more parameters for control channel communications based on such a determination (e.g., a transmission power level, a coding rate, a modulation scheme, a number of repetitions, or any combinations thereof).

A method for wireless communication at a user equipment (UE) is described. The method may include monitoring for a set of multiple downlink transmissions from a base station that are associated with a set of feedback processes, generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission, and transmitting, to the base station, a feedback message that includes the feedback report and an indication of a number of negative-acknowledgments of the feedback report that are due to unsuccessful receipt of data channel transmissions.

An apparatus for wireless communication at a UE is described. The apparatus may include a processor, memory coupled with the processor, and instructions stored in the memory. The instructions may be executable by the processor to cause the apparatus to monitor for a set of multiple downlink transmissions from a base station that are associated with a set of feedback processes, generate a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission, and transmit, to the base station, a feedback message that includes the feedback report and an indication of a number of negative-acknowledgments of the feedback report that are due to unsuccessful receipt of data channel transmissions.

Another apparatus for wireless communication at a UE is described. The apparatus may include means for monitoring for a set of multiple downlink transmissions from a base station that are associated with a set of feedback processes, means for generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission, and means for transmitting, to the base station, a feedback message that includes the feedback report and an indication of a number of negative-acknowledgments of the feedback report that are due to unsuccessful receipt of data channel transmissions.

A non-transitory computer-readable medium storing code for wireless communication at a UE is described. The code may include instructions executable by a processor to monitor for a set of multiple downlink transmissions from a base station that are associated with a set of feedback processes, generate a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission, and transmit, to the base station, a feedback message that includes the feedback report and an indication of a number of negative-acknowledgments of the feedback report that are due to unsuccessful receipt of data channel transmissions.

In some examples of the method, apparatuses, and non-transitory computer-readable medium described herein, the indication of the number of negative-acknowledgments provides the number of negative-acknowledgments in a number of bits that are determined based on a number of feedback indications that are included in the feedback report. In some examples of the method, apparatuses, and non-transitory computer-readable medium described herein, the indication of the number of negative-acknowledgments is a quantized indication with a linear quantization of an amount of negative-acknowledgments due to unsuccessful receipt of data channel transmissions that are included in the feedback report. Some examples of the method, apparatuses, and non-transitory computer-readable medium described herein may further include operations, features, means, or instructions for receiving, from the base station, control signaling that provides a number of bits for the indication of the number of negative-acknowledgments due to unsuccessful receipt of data channel transmissions.

Some examples of the method, apparatuses, and non-transitory computer-readable medium described herein may further include operations, features, means, or instructions for determining the amount of negative-acknowledgments associated with each quantization point based on the number of bits and a number of feedback indications in the feedback report. In some examples of the method, apparatuses, and non-transitory computer-readable medium described herein, the control signaling further indicates a quantization granularity for each quantization point of a set of quantization points. In some examples of the method, apparatuses, and non-transitory computer-readable medium described herein, a last quantization point of the set of quantization points includes all remaining amounts of negative-acknowledgments due to unsuccessful receipt of data channel transmissions that are included in the feedback report that is not quantized by prior quantization points.

In some examples of the method, apparatuses, and non-transitory computer-readable medium described herein, the indication of the number of negative-acknowledgments is a quantized indication with a non-linear quantization of an amount of negative-acknowledgments due to unsuccessful receipt of data channel transmissions that are included in the feedback report. In some examples of the method, apparatuses, and non-transitory computer-readable medium described herein, a first subset of a set of quantization points provide a first granularity of a first amount of negative-acknowledgments and a second subset of the set of quantization points provide a second granularity of a second amount of negative-acknowledgments, and where the first amount of negative-acknowledgments is less than the second amount of negative-acknowledgments. In some examples of the method, apparatuses, and non-transitory computer-readable medium described herein, the non-linear quantization is a logarithmic quantization in which successive quantization points indicate increasing amounts of negative-acknowledgments according to an exponential function. In some examples of the method, apparatuses, and non-transitory computer-readable medium described herein, a first subset of a set of quantization points provide linear quantization and a second subset of the set of quantization points provide non-linear quantization.

A method for wireless communication at a base station is described. The method may include transmitting, to a UE, a set of multiple downlink transmissions that are associated with a set of feedback processes, where each downlink transmission has an associated control channel transmission and an associated data channel transmission, receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions, and retransmitting one or more of the set of multiple downlink transmissions based on the feedback message.

An apparatus for wireless communication at a base station is described. The apparatus may include a processor, memory coupled with the processor, and instructions stored in the memory. The instructions may be executable by the processor to cause the apparatus to transmit, to a UE, a set of multiple downlink transmissions that are associated with a set of feedback processes, where each downlink transmission has an associated control channel transmission and an associated data channel transmission, receive, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions, and retransmit one or more of the set of multiple downlink transmissions based on the feedback message.

Another apparatus for wireless communication at a base station is described. The apparatus may include means for transmitting, to a UE, a set of multiple downlink transmissions that are associated with a set of feedback processes, where each downlink transmission has an associated control channel transmission and an associated data channel transmission, means for receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions, and means for retransmitting one or more of the set of multiple downlink transmissions based on the feedback message.

A non-transitory computer-readable medium storing code for wireless communication at a base station is described. The code may include instructions executable by a processor to transmit, to a UE, a set of multiple downlink transmissions that are associated with a set of feedback processes, where each downlink transmission has an associated control channel transmission and an associated data channel transmission, receive, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions, and retransmit one or more of the set of multiple downlink transmissions based on the feedback message.

In some examples of the method, apparatuses, and non-transitory computer-readable medium described herein, the indication of the number of negative-acknowledgments provides the number of negative-acknowledgments in a number of bits that are determined based on a number of feedback indications that are included in the feedback report. In some examples of the method, apparatuses, and non-transitory computer-readable medium described herein, the indication of the number of negative-acknowledgments is a quantized indication with a linear quantization of an amount of negative-acknowledgments due to unsuccessful receipt of data channel transmissions that are included in the feedback report. Some examples of the method, apparatuses, and non-transitory computer-readable medium described herein may further include operations, features, means, or instructions for transmitting, to the UE, control signaling that provides a number of bits for the indication of the number of negative-acknowledgments due to unsuccessful receipt of data channel transmissions.

Some examples of the method, apparatuses, and non-transitory computer-readable medium described herein may further include operations, features, means, or instructions for determining the amount of negative-acknowledgments associated with each quantization point based on the number of bits and a number of feedback indications in the feedback report. In some examples of the method, apparatuses, and non-transitory computer-readable medium described herein, the control signaling further indicates a quantization granularity for each quantization point of a set of quantization points. In some examples of the method, apparatuses, and non-transitory computer-readable medium described herein, a last quantization point of the set of quantization points includes all remaining amounts of negative-acknowledgments due to unsuccessful receipt of data channel transmissions that are included in the feedback report that are not quantized by prior quantization points.

In some examples of the method, apparatuses, and non-transitory computer-readable medium described herein, the indication of the number of negative-acknowledgments is a quantized indication with a non-linear quantization of an amount of negative-acknowledgments that are included in the feedback report. In some examples of the method, apparatuses, and non-transitory computer-readable medium described herein, a first subset of a set of quantization points provide a first granularity of a first amount of negative-acknowledgments and a second subset of the set of quantization points provide a second granularity of a second amount of negative-acknowledgments, and where the first amount of negative-acknowledgments is less than the second amount of negative-acknowledgments. In some examples of the method, apparatuses, and non-transitory computer-readable medium described herein, the non-linear quantization is a logarithmic quantization in which successive quantization points indicate increasing amounts of negative-acknowledgments according to an exponential function. In some examples of the method, apparatuses, and non-transitory computer-readable medium described herein, a first subset of a set of quantization points provide linear quantization and a second subset of the set of quantization points provide non-linear quantization.

DETAILED DESCRIPTION

Figure 1:
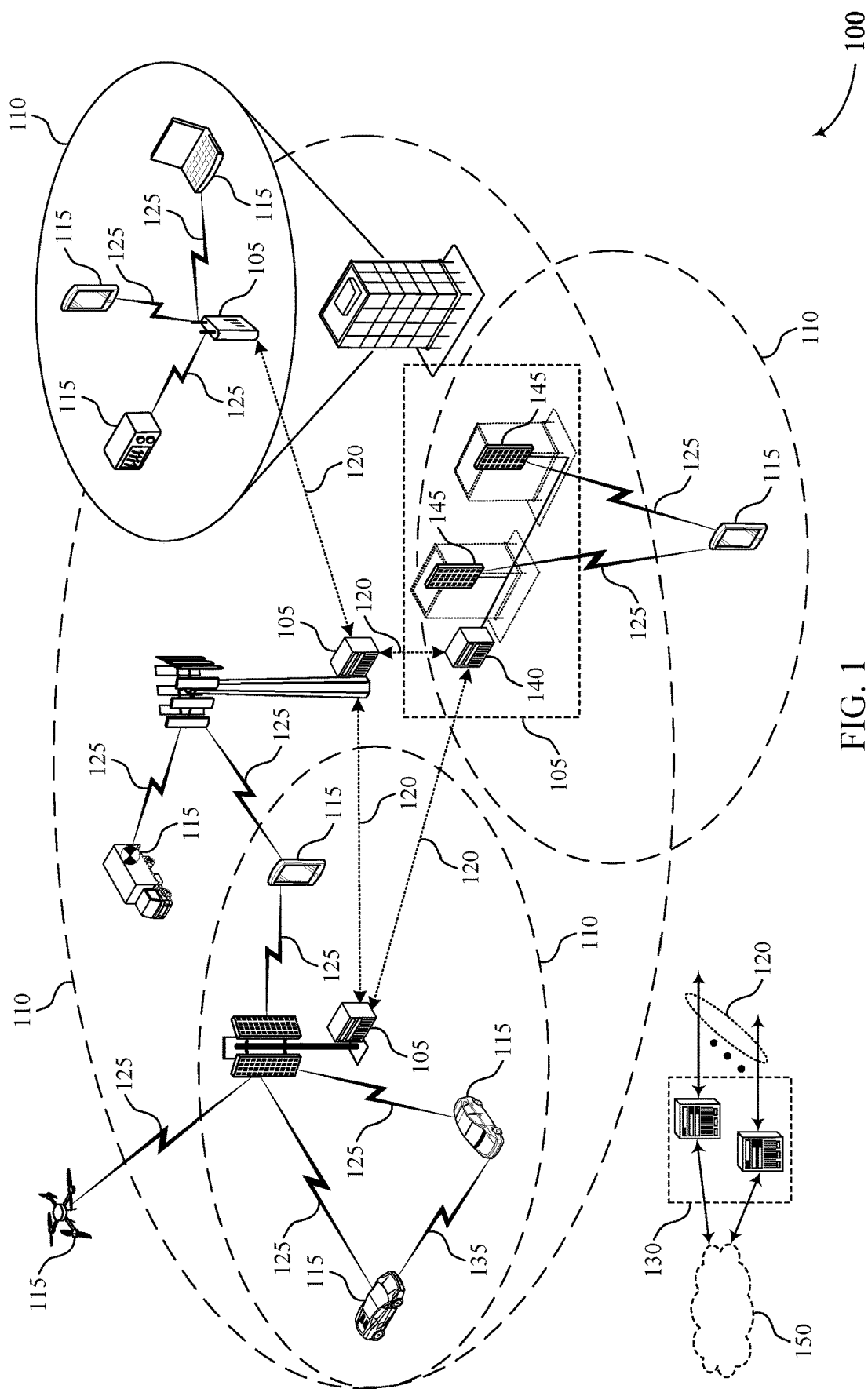
FIG. 1 illustrates an example of a wireless communications system that supports feedback techniques in wireless communications in accordance with aspects of the present disclosure.

In some wireless communications systems, feedback information may be exchanged between a base station and a user equipment (UE) that indicates whether a communication has been successfully received at a receiving device. For example, UEs and base stations may transmit hybrid automatic repeat request (HARQ) feedback that indicates successful or unsuccessful receipt of a communication. Such feedback information may include, for example, an acknowledgment (ACK) indication for a successfully received transmission, and a negative acknowledgment (NACK) indication for an unsuccessfully received transmission. Upon receiving the feedback, the transmitting device may retransmit one or more transmissions that have a NACK indication.

In some cases, the feedback information for a set of communications, such as HARQ feedback information from a UE for a set of downlink transmissions, may be transmitted in a feedback codebook, or feedback report, that contains a set of downlink decoding outcomes (e.g., a set of physical downlink shared channel (PDSCH) decoding outcomes), with an ACK indicating a decoding pass and a NACK indicating a decoding fail. When receiving a downlink communication, decoding failure may result from either a failure of decoding a control channel (e.g., physical downlink control channel (PDCCH)) transmission that provides scheduling information for a PDSCH communication, or from a failure of decoding of the data channel or PDSCH communication itself. As used herein, a NACK that is associated with a failure of decoding of a data channel (e.g., PDSCH) is referred to as a "true NACK" (e.g., because of PDSCH decoding failure due to poor PDSCH channel quality), and a NACK that is associated with a failure to receive and decode a control channel (e.g. PDCCH) transmission is referred to as a "dummy NACK" which may result from the UE being in a discontinuous reception (DRX) state or due to poor control channel quality. Current feedback codebooks transmissions do not distinguish these two types of NACKs, and thus a base station that receives a feedback report with multiple NACKs may not be able to distinguish whether the control channel or the data channel needs enhancement.

Various techniques discussed herein provide enhanced feedback that may indicate whether one or more communications are successfully or unsuccessfully received and that also indicates, in cases of unsuccessful receipts, information related to a number of such unsuccessful receptions that are the result of unsuccessful control channel or data channel receptions. In some cases, a UE may provide a feedback message to a base station that includes a feedback report with multiple ACK/NACK indications for multiple downlink transmissions. The feedback message may also include an indication of a number of NACKs that are due to unsuccessful receipt of data channel communications (e.g., a number of true NACKs). In some cases, the indication of the number of NACKs that are due to unsuccessful receipt of data channel transmissions may be provided as a binary representation of the total number of such NACKs, or may be provided as a quantized value in which each quantized point is associated with a certain number of such NACKs. The base station may receive the feedback message, and prepare one or more retransmissions for one or more downlink transmissions for which a NACK is reported. In some cases, based on the indication of the number of NACKs associated with data channel transmissions, the base station may modify one or more transmission parameters for the control channel, for the data channel, or combinations thereof. For example, the base station may determine that the control channel is experiencing a relatively high rate of NACKs, and may adjust one or more parameters for control channel communications based on such a determination (e.g., a transmission power level, a coding rate, a modulation scheme, a number of repetitions, or any combinations thereof).

Such techniques may provide for increased reliability for wireless communications (e.g., PDCCH and PDSCH transmissions), and also provide for reduced wireless resource usage associated with multiple repetitions of a communication. Thus, techniques such as discussed herein provide for enhanced reliability in wireless communications, as well as power savings and reduced resource usage through efficient indication of types of NACKs that are being experienced in the system that may enable a base station to adjust parameters for one or more channels that may be experiencing high rates of NACKs. Such techniques may also provide for increased network capacity and throughput through efficient usage of wireless resources, thus providing an enhanced user experience.

Aspects of the disclosure are initially described in the context of wireless communications systems. Various examples of communications and associated feedback messages are then discussed. Aspects of the disclosure are further illustrated by and described with reference to process flows, apparatus diagrams, system diagrams, and flowcharts that relate to feedback techniques in wireless communications.

FIG. 1 illustrates an example of a wireless communications system 100 that supports feedback techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may provide a feedback message to a base station 105 that includes a feedback report (e.g., a HARQ feedback report or HARQ codebook) with multiple ACK/NACK indications for multiple downlink transmissions. The feedback message may also include an indication of a number of NACKs that are due to unsuccessful receipt of data channel communications (e.g., a number of true NACKs). In some cases, the indication of the number of NACKs that are due to unsuccessful receipt of data channel transmissions may be provided as a binary representation of the total number of such NACKs, or may be provided as a quantized value in which each quantized point is associated with a certain number of such NACKs. The base station 105 may receive the feedback message, and prepare one or more retransmissions for one or more downlink transmissions for which a NACK is reported. In some cases, based on the indication of the number of NACKs associated with data channel transmissions, the base station 105 may modify one or more transmission parameters for the control channel, for the data channel, or combinations thereof.

Figure 2:
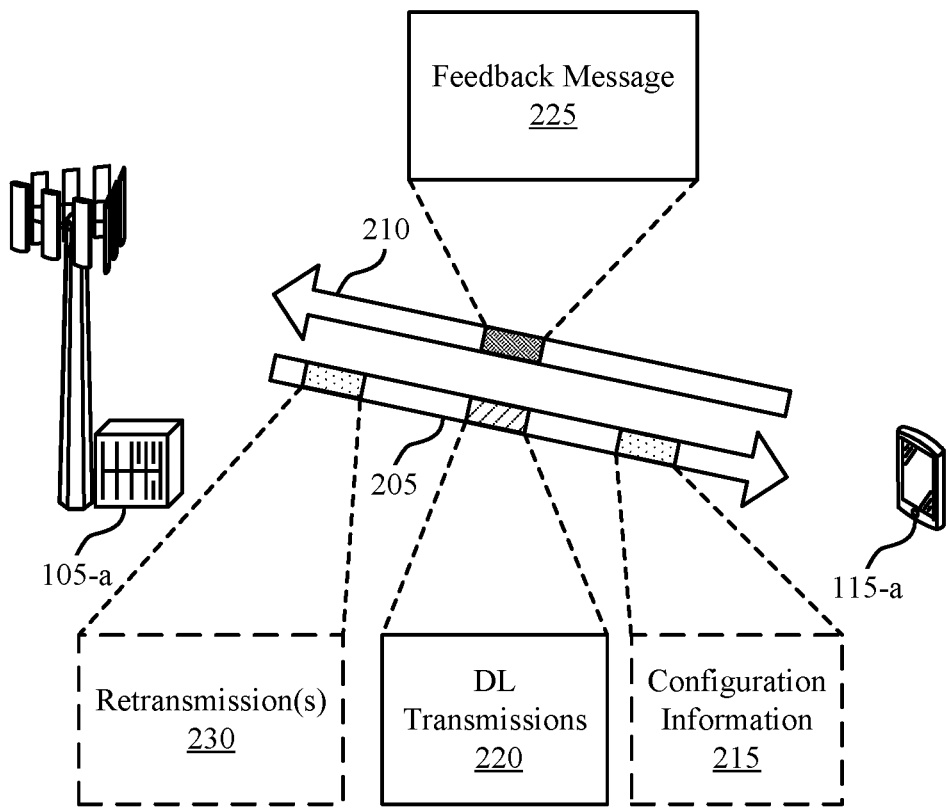
FIG. 2 illustrates an example of a portion of a wireless communications system that supports feedback techniques in wireless communications in accordance with aspects of the present disclosure.

FIG. 2 illustrates an example of a wireless communications system 200 that supports feedback techniques in wireless communications in accordance with aspects of the present disclosure. In some examples, wireless communications system 200 may implement aspects of wireless communications system 100. For example, the wireless communications system 200 may include a base station 105-a and a UE 115-a, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems. The wireless communications system 200 may include feedback techniques that provide for improvements to communications reliability and resource usage, power savings and, in some examples, may promote high reliability and low latency uplink operations, among other benefits.

In the example of FIG. 2, the base station 105-a may transmit downlink communications to the UE 115-a via a downlink connection 205 and the UE 115-a may transmit uplink communications to the base station 105-a via an uplink connection 210. In some cases, the base station 105-a may transmit configuration information 215 to the UE 115-a. Such configuration information may include, for example, RRC configuration information that configures various aspects of communications between the UE 115-a and the base station 105-a. In some cases, the configuration information 215 may include feedback configuration information that configures a feedback message 225 that is to be transmitted by the UE 115-a. In some cases, the feedback message 225 may be configured to provide a feedback report or HARQ feedback codebook along with an indication of a number of NACKs that are reported within the feedback report that are associated with a data channel transmission (e.g., an indication of a number of true NACKs).

In some cases, the base station 105-a may transmit a number of downlink transmissions 220 to the UE 115-a, which may include PDCCH transmissions (e.g., that provide scheduling information) and PDSCH transmissions (e.g., that include data for the UE 115-a). The UE 115-a may monitor for the downlink transmissions 220, attempt to decode each of the transmissions, and determine HARQ feedback associated with each of the downlink transmissions 220. In some cases, each of the downlink transmissions may be associated with a HARQ process ID, and the UE 115-*a* may generate a HARQ-ACK codebook that includes an ACK/NACK for each HARQ process ID that is based on whether decoding of the associated PDSCH transmission succeeded or failed.

As discussed herein, in some cases decoding of the PDCCH transmissions may fail, which may result in the UE 115-*a* being unable to obtain scheduling information for the associated PDSCH, and the corresponding NACK in the feedback codebook is thus a dummy NACK. Further, in cases where the UE 115-*a* is able to decode a PDCCH but fails to decode the associated PDSCH, the corresponding NACK in the feedback codebook is a true NACK. In various aspects of the present disclosure, the feedback message 225 may include an indication of a number of true NACKs that are associated with the feedback codebook. While various aspects of the present disclosure discuss providing an indication of a number of true NACKs, or NACKs that are associated with unsuccessful receipt of a data channel transmission, such techniques may be used to provide an indication of a number of dummy NACKs or NACKs that are a result of unsuccessful receipt of a control channel transmission. In some cases, an indication of true NACKs is provided because a relatively large number of dummy NACKs may be present in a HARQ codebook (e.g., due to DRX, a number of scheduled downlink transmissions of a codebook, and the like), and an indication of true NACKs may consume less overhead. Based on the feedback message 225, the base station 105-*a* may transmit one or more retransmissions 230 to the UE 115-*a*. In some cases, the base station 105-*a* may adjust one or more transmission parameters associated with PDCCH or PDSCH communications based on the number of true or dummy NACKs that are reported by the UE 115-*a*.

In some cases, the indication of the number of true NACKs (or dummy NACKs) may be provided as a binary representation of the total number of such NACKs, or may be provided as a quantized value in which each quantized point is associated with a certain number of such NACKs. In cases where the UE 115-*a* provides an indication of the number of true NACKs without quantization, the number of bits used to provide such an indication may correspond to a number of bits needed to provide a digital representation of the number of true NACKs. For example, for a feedback codebook that can indicate zero through K NACKs, the indication may include M bits, where M=ceil($\log_2(K+1)$) that can represent {0, 1, 2, 3, . . . , K} true NACKs. Such an indication thus has a report granularity that is per one true NACK. In cases where quantized values are provided, such as discussed in the examples of FIGS. 5A through 5C, the number of bits that are used to provide such an indication may be reduced, thus helping to reduce overhead associated with providing such an indication of a number of true NACKs (or dummy NACKs).

Figure 3:
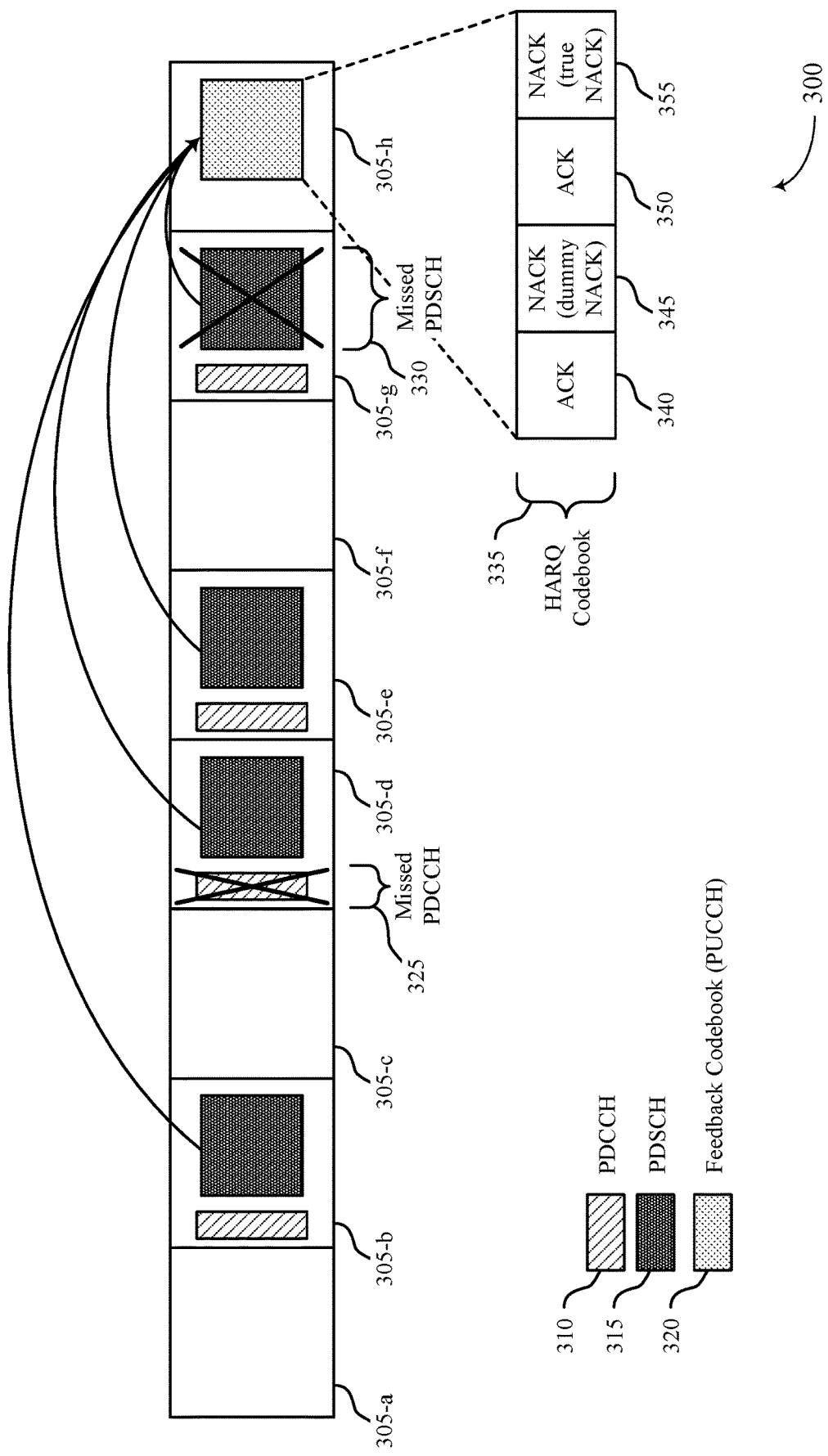
FIG. 3 illustrates an example of a set of downlink communications and associated feedback report that supports feedback techniques in wireless communications in accordance with aspects of the present disclosure.

FIG. 3 illustrates an example of a set of downlink communications and associated feedback report 300 that supports feedback techniques in wireless communications in accordance with aspects of the present disclosure. In some examples, such communications and associated feedback report 300 may be implemented in aspects of wireless communications systems 100 or 200.

In this example, a number of slots 305 (or other transmission time intervals, such as subframes) may include resources for communications between a base station and a UE. A first slot 305-*a* (and a third slot 305-*c* and sixth slot 305-*f*) may not include any communications associated with the UE, and a second slot 305-*b* may include PDCCH 310 resources and PDSCH 315 resources associated with a first HARQ process ID. In this example, the UE may successfully decode each of the PDCCH 310 and PDSCH 315 in the second slot 305-*b*. In this example, a fourth slot 305-*d* may be associated with a second HARQ process ID and may have an associated PDCCH 310 and PDSCH 315, and decoding of the PDCCH 310 may fail, thus resulting in missed PDCCH 325 and the UE not successfully receiving the PDSCH 315 for this slot. A fifth slot 305-*e* may be associated with a third HARQ process ID and may have an associated PDCCH 310 and PDSCH 315 that are both successfully decoded. A seventh slot 305-*g* in this example, may be associated with a fourth HARQ process ID, and the UE may successfully decode the associated PDCCH 310 but fail in decoding the PDSCH 315 resulting in missed PDSCH 330.

The UE may thus generate a HARQ codebook 335 that includes an ACK/NACK indication for each of the four HARQ process IDs that are to be reported by the UE in an uplink transmission (e.g., a physical uplink control channel (PUCCH) transmission) of a feedback codebook 320 in eighth slot 305-*h*. In this example, the HARQ codebook 335 may include a first bit 340 for the first HARQ process ID that indicates an ACK, a second bit 345 for the second HARQ process ID that indicates a NACK that is a dummy NACK due to the missed PDCCH 325, a third bit 350 for the third HARQ process ID that indicates an ACK, and a fourth bit 355 for the fourth HARQ process ID that indicates a NACK that is a true NACK due to the missed PDSCH 330. While a four-bit HARQ codebook 335 is illustrated in this example, in other examples HARQ codebooks may be transmitted that have significantly more bits (e.g., a 64 bit codebook or larger), and the example of FIG. 3 is provided for purposes of discussion and illustration. As discussed herein, it may be useful for a base station to be aware of how many reported NACKs are true NACKs and how many reported NACKs are dummy NACKs. Such information may allow the base station to implement one or more enhancements to PDCCH or PDSCH transmissions, or both, in the event that a relatively large number of NACKs associated with a particular channel are present. Such communications adjustments may help to enhance the reliability and efficiency of communications between the UE and the base station.

Figure 4A:
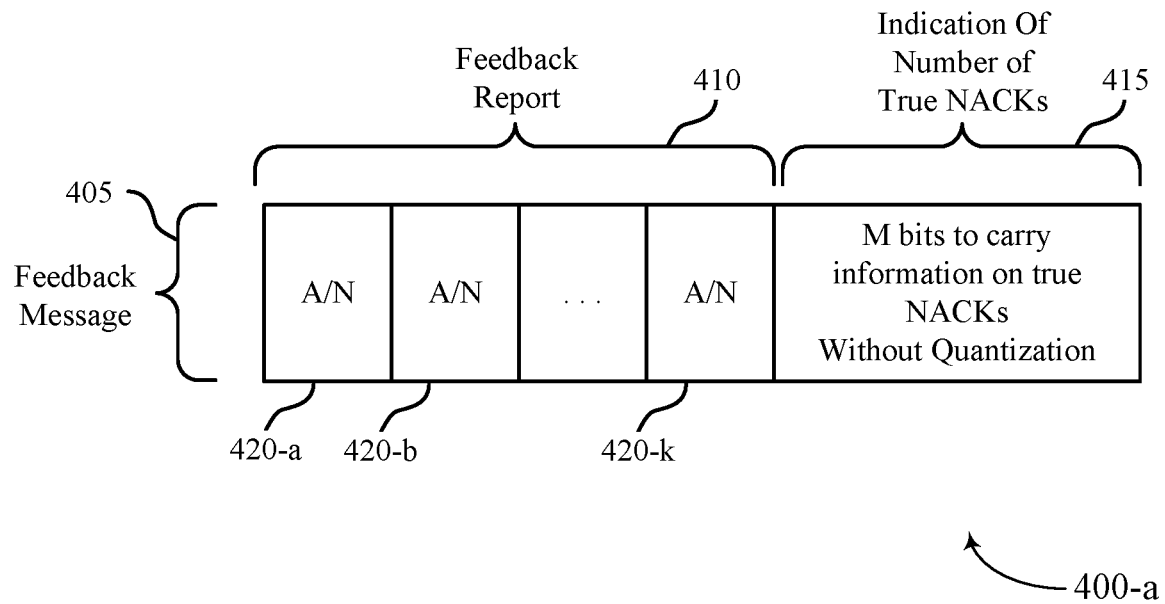
FIGS. 4A and 4B illustrate examples of a feedback messages that support feedback techniques in wireless communications in accordance with aspects of the present disclosure.
Figure 4B:
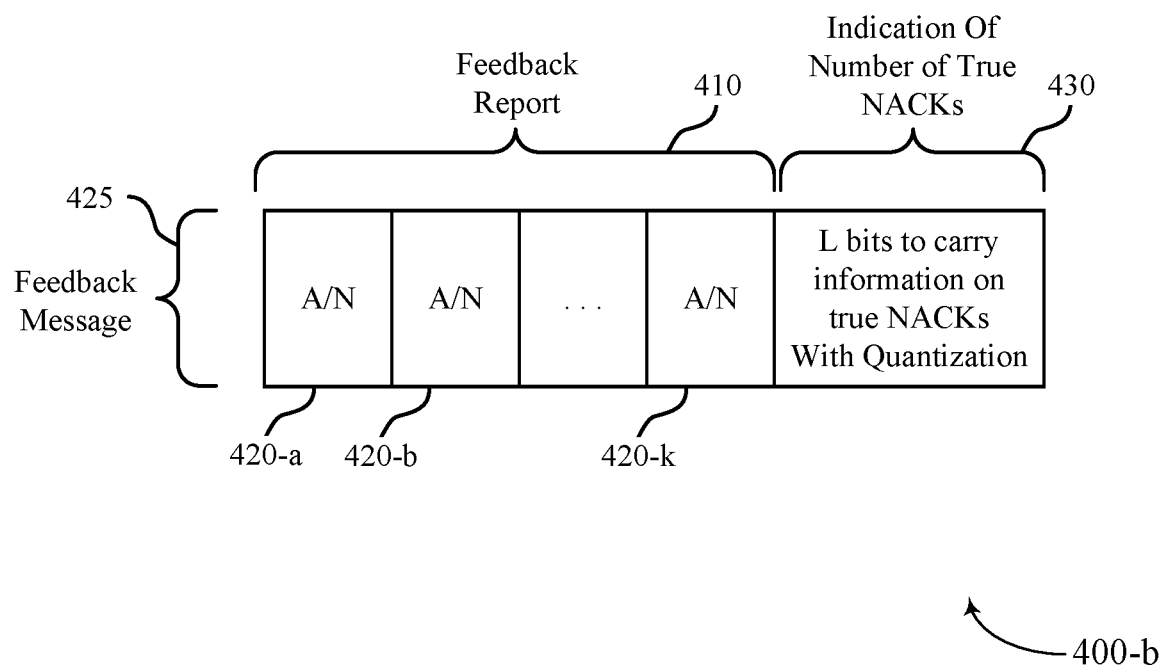

FIGS. 4A and 4B illustrate examples 400 of feedback messages that may provide indications of the number of true NACKs associated with a feedback report in accordance with aspects of the present disclosure. In some examples, such communications and associated feedback messages may be implemented in aspects of wireless communications systems 100 or 200.

In a first example 400-*a* of FIG. 4A, a first feedback message 405 may include a feedback report 410 and an unquantized indication 415 of a number of true NACKs that are associated with the feedback report 410. In this example, the feedback report 410 may include ACK/NACK bits 420 for zero through K HARQ feedback process IDs, corresponding to ACK/NACK bits 420-*a* through 420-*k*. The unquantized indication 415 of the number of true NACKs in this case may be provided in M bits that provide the number of true NACKs without quantization. Thus, in this example, at the end of the HARQ-ACK codebook of feedback report 410 (e.g., with length=K bits, with each bit=ACK or NACK), the UE may append the M-bit unquantized indication 415 indicate how many true NACK bits are in the K bits codebook. The M bits to report the number of true NACKs without quantization is thus M=ceil($\log_2(K+1)$).

In a second example 400-*b* of FIG. 4B, a second feedback message 425 may include the feedback report 410 and a quantized indication 430 of the number of true NACKs that are associated with the feedback report 410. In this example, the quantized indication 430 may be carried in L bits, where L<M. Thus, overhead may be reduced for the quantized indication 430 relative to the unquantized indication 415. In various examples, different quantization techniques may be used for reporting the number of true NACKs, some of which are discussed with reference to FIGS. 5A, 5B, and 5C.

Figure 5A:
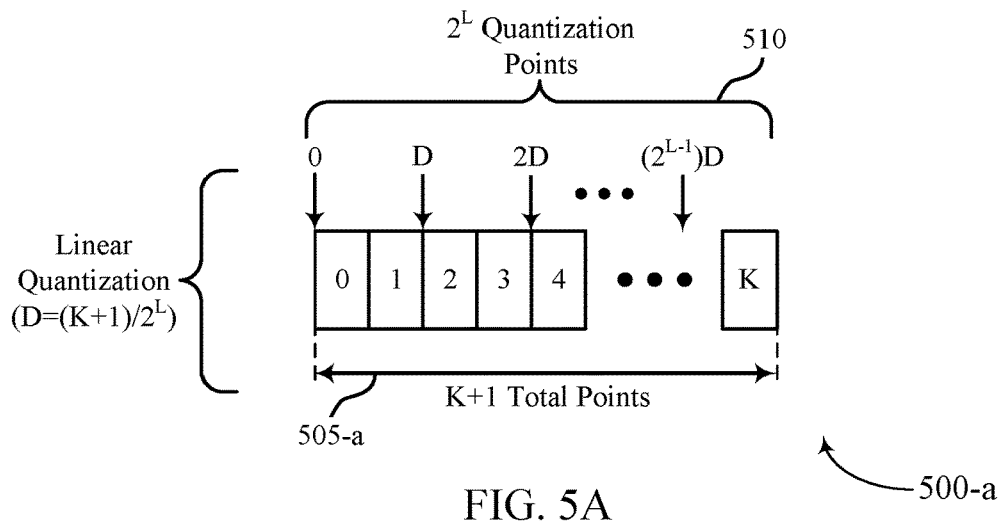
FIGS. 5A, 5B, and 5C illustrate examples of quantization schemes that support feedback techniques in wireless communications in accordance with aspects of the present disclosure.
Figure 5B:
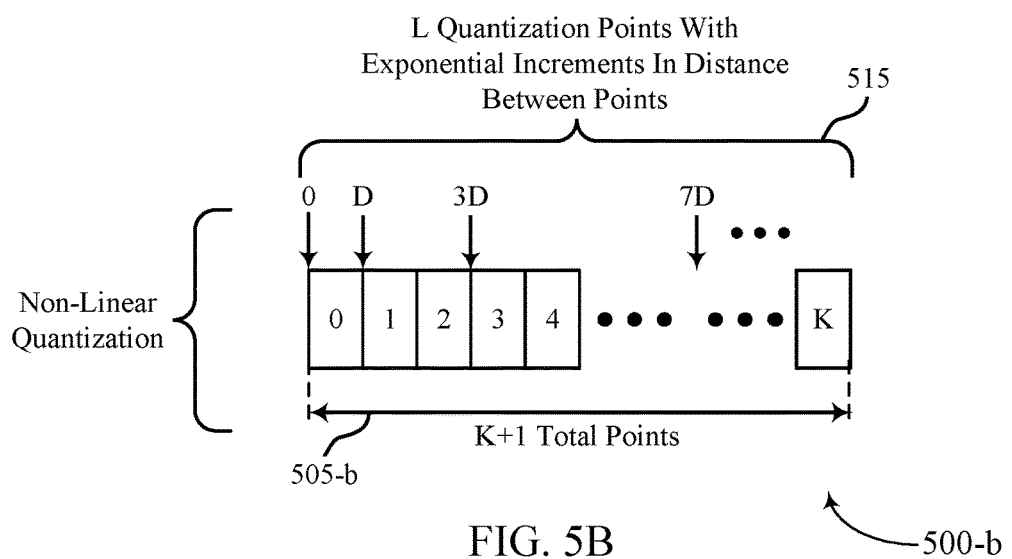
Figure 5C:
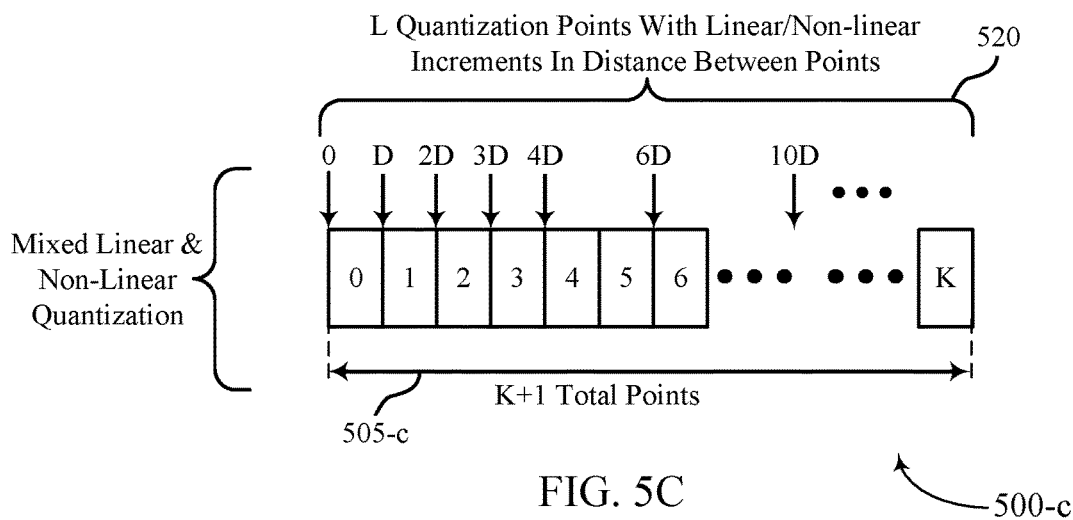

FIGS. 5A, 5B, and 5C illustrate examples of quantization schemes 500 that support feedback techniques in wireless communications in accordance with aspects of the present disclosure. In some examples, such quantization schemes 500 may be implemented in aspects of wireless communications systems 100 or 200.

In a first example of FIG. 5A, a linear quantization scheme 500-$a$ is illustrated. In this example, K+1 total points 505-$a$ (corresponding to HARQ ACK/NACK bits zero through K) may be reported with $2^L$ quantization points 510 (where L<ceil($\log_2$(K+1)). In some cases, the base station may signal the number of bits (L) to report true NACKs, and the UE may derive the granularity of reported number of true NACKs as D=(K+1)/$2^L$. In such cases, for each feedback report, the UE may quantize the actual number of true NACKs in the codebook to the nearest quantization point and then encode the quantization point into L bits, and provide the resulting indication in a feedback message along with the feedback report. In such examples, there are in total $2^L$ quantization points, and L bits can represent which one out of the $2^L$ quantization points the UE wants to report. For example, with K=63 (corresponding to a 64-bit feedback codebook) and L=4, each successive quantization point would correspond to increments of four true NACKs. Thus, in this example, four bits may be used to report the number of true NACKs, compared to six bits that would be necessary to report an unquantized value of the number of true NACKs. In some cases, the base station may provide an indication of the number of bits (L) and a quantization granularity (D). In such cases, for each report, the UE may quantize the actual number true NACKs in the codebook to the nearest quantization point and then encode the quantization point into L bits, with a last quantization point corresponding to remaining numbers of true NACKs that are to be reported.

In other examples, non-linear quantization may be used to report the number of true NACKs. In the example of FIG. 5B, such a non-linear quantization scheme 500-$b$ is illustrated in which K+1 total points 505-$b$ are reported with L quantization points 515 with exponential increments in distance between successive quantization points. In such examples, the base station may signal a number of bits to report the number of true NACKs (e.g., as L bits, where L<ceil($\log_2$(K+1))). The UE may set the quantization points following unequal distance between quantization points, such as increase the distance between quantization points following exponential increments (e.g., 0, D, 3D, 7D, and so on). Such techniques may provide enhanced granularity for relatively small numbers of true NACKs that are reported, and reduced granularity as the number of true NACKs increases (e.g., indicating poor channel quality).

In further examples, mixed linear and non-linear quantization may be used to report the number of true NACKs. In the example of FIG. 5C, such a mixed linear and non-linear quantization scheme 500-$c$ is illustrated in which K+1 total points 505-$c$ are reported with L quantization points 520 in which a subset of the quantization points 520 have a linear distance between points and remaining quantization points 520 outside of the subset have non-linear distance between points (e.g., exponential increments in distance between successive quantization points). In such examples, the base station again may signal a number of bits to report the number of true NACKs (e.g., as L bits, where L<ceil($\log_2$(K+1))), and a number of bits that are in a linear subset of the quantization points. The UE may set the quantization points with equal distance for the subset of quantization points, and following unequal distance between quantization points for remaining points. For example, with K=20 and L=3, the UE set the following quantization points:

0 NACK→1st quantization point
1 NACK→2nd quantization point
2 NACKs→3rd quantization point
3 NACKs→4th quantization point
4 NACKs→5th quantization point
5-6 NACKs→6th quantization point
7-10 NACKs→7th quantization point
≥11 NACKs 8th quantization point Such techniques may provide further enhanced granularity for relatively small numbers of true NACKs that are reported, and reduced granularity as the number of true NACKs increases (e.g., indicating poor channel quality).

Figure 6:
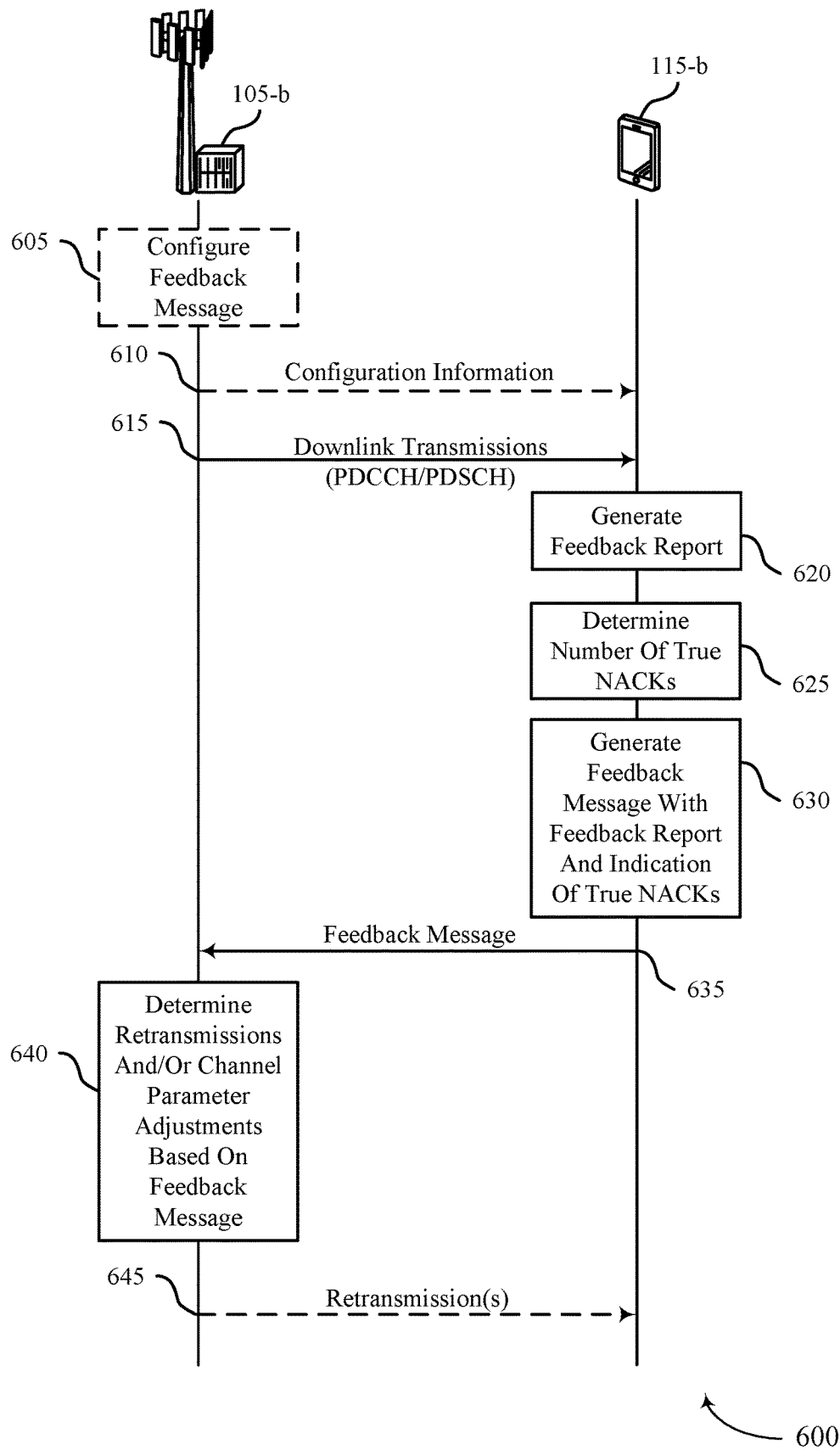
FIG. 6 illustrates an example of a process flow that supports feedback techniques in wireless communications in accordance with aspects of the present disclosure.

FIG. 6 illustrates an example of a process flow 600 that supports feedback techniques in wireless communications in accordance with aspects of the present disclosure. In some examples, process flow 600 may implement aspects of wireless communications system 100 or 200. Process flow 600 may be implemented by a base station 105-$b$ and a UE 115-$b$, which may be examples of base stations 105 and UEs 115 as described herein. Alternative examples of the following may be implemented, where some steps are performed in a different order than described or are not performed at all. In some cases, steps may include additional features not mentioned below, or further steps may be added.

In this example, at 605, the base station 105-$b$ optionally may configure a feedback message for the UE 115-$b$. At 610, in cases where the base station 105-$b$ configures the feedback message, configuration information may be transmitted to the UE 115-$b$ that provides the configuration information. The configuration information may be provided, for example, in RRC signaling, in a MAC-CE, or in other configuration information that may be provided to the UE 115-$b$. In some cases, the configuration information may enable the UE 115-$b$ to transmit feedback messages that comprise a feedback report and an indication of a number of true NACKs associated with the feedback report (or a number of dummy NACKs associated with the feedback report). Additionally or alternatively, such configuration information may provide parameters for a size of the indication (e.g., a number of bits over which the UE 115-$b$ is to quantize the number of true NACKs), a quantization scheme for the indication (e.g., linear quantization, non-linear quantization, or mixed linear and non-linear quantization), or any combinations thereof.

At 615, the base station 105-$b$ may transmit multiple downlink transmissions to the UE 115-$b$. For example, the base station 105-$b$ may transmit multiple PDCCH transmissions that contain scheduling information for corresponding PDSCH transmissions that contain data for the UE 115-$b$. The downlink transmissions may be transmitted in a set of downlink communications that are configured for feedback using a feedback report (e.g., a HARQ feedback codebook).

At 620, the UE 115-$b$ may generate a feedback report associated with the downlink transmissions. The feedback report may be generated based on whether decoding of the multiple downlink transmissions was successful or unsuccessful. As discussed herein, in some cases, the feedback report may include one or more true NACKs, and one or more dummy NACKs. At 625, the UE 115-b may determine the number of true NACKs (e.g., NACKs that correspond to unsuccessful decoding of PDSCH or data channel transmissions).

At 630, the UE 115-b may generate a feedback message with the feedback report and an indication of the number of true NACKs. As discussed herein, in some cases, the indication of the number of true NACKs may provide the actual number of true NACKs that is unquantized. In other cases, the indication of the number of true NACKs may be quantized according to a linear quantization scheme, a non-linear quantization scheme, or a mixed linear and non-linear quantization scheme. At 635, the UE 115-b may transmit the feedback message to the base station 105-b.

At 640, the base station 105-b may receive the feedback message and determine one or more retransmissions, channel adjustments, or combinations thereof, based on the feedback message. For example, in cases where the indication of the number of true NACKs indicates that relatively few of the reported NACKs are true NACKs, the base station 105-b may determine that the PDCCH should be enhanced, and the base station 105-b may modify one or more transmission parameters of the PDCCH (e.g., modify one or more of a transmit power, modulation and coding scheme (MCS), number of repetitions, etc.), to enhance the reliability of PDCCH transmissions. In cases where a majority or nearly all of the reported NACKs are true NACKs, the base station 105-b may determine that the PDCCH is relatively reliable and may adjust one or more parameters for the PDSCH communications (e.g., transmit power, MCS, repetition level, etc.). At 645, the base station 105-b may transmit one or more retransmissions of the downlink communications, if it is determined from the feedback report that one or more retransmissions are triggered.

Figure 7:
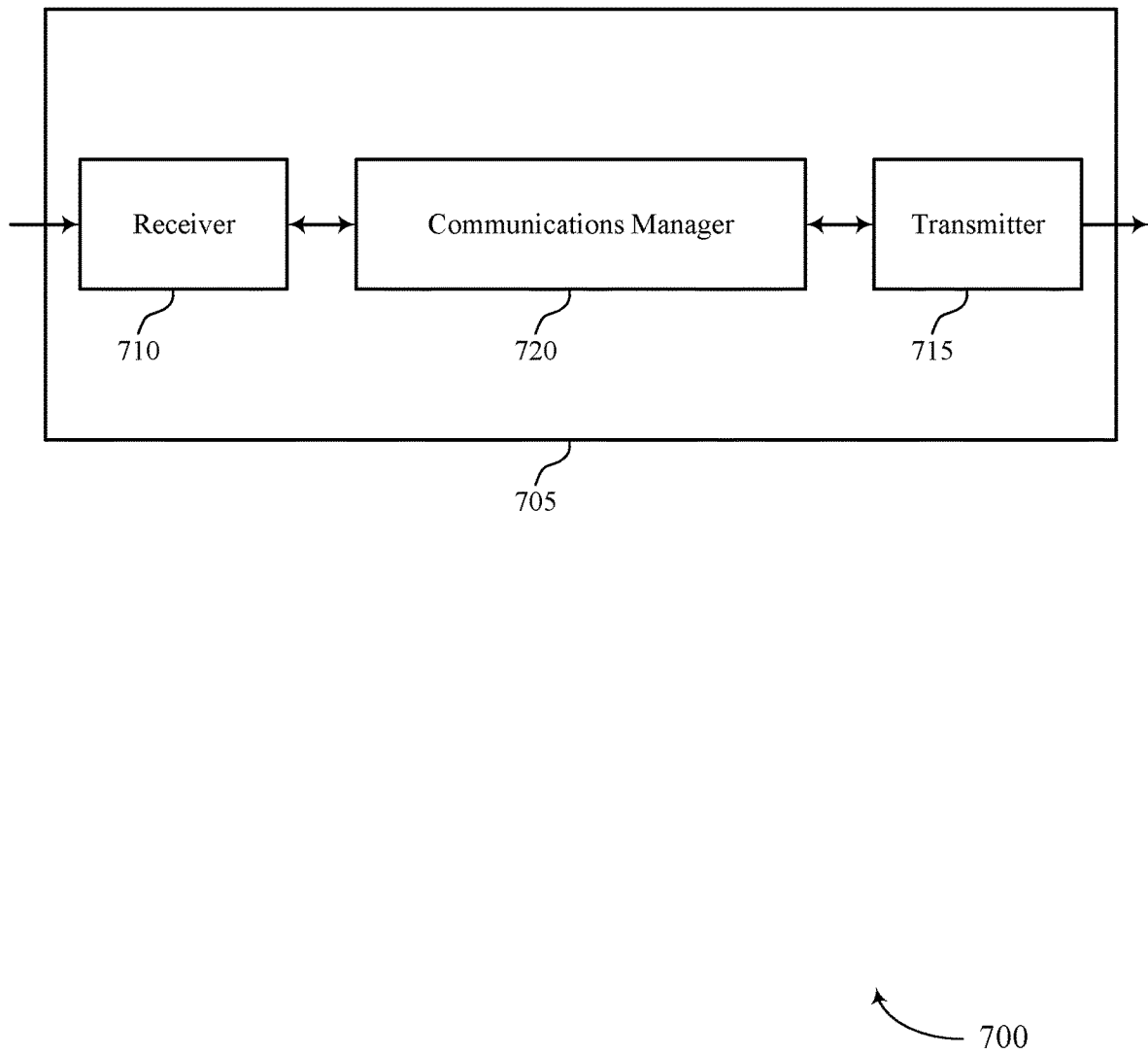
FIGS. 7 and 8 show block diagrams of devices that support feedback techniques in wireless communications in accordance with aspects of the present disclosure.

FIG. 7 shows a block diagram 700 of a device 705 that supports feedback techniques in wireless communications in accordance with aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the feedback techniques discussed herein. Each of these components may be in communication with one another (e.g., via one or more buses).

The receiver 710 may provide a means for receiving information such as packets, user data, control information, or any combination thereof associated with various information channels (e.g., control channels, data channels, information channels related to feedback techniques in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to feedback techniques in wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of feedback techniques in wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for monitoring for a set of multiple downlink transmissions from a base station that are associated with a set of feedback processes. The communications manager 720 may be configured as or otherwise support a means for generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission. The communications manager 720 may be configured as or otherwise support a means for transmitting, to the base station, a feedback message that includes the feedback report and an indication of a number of negative-acknowledgments of the feedback report that are due to unsuccessful receipt of data channel transmissions.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for increased reliability for downlink communications (e.g., PDCCH and PDSCH transmissions), and also provide for power savings and reduced processing resource usage through reduction in a number of retransmissions due to enhanced adjustment of control or data channels that may have poor channel quality.

Figure 8:
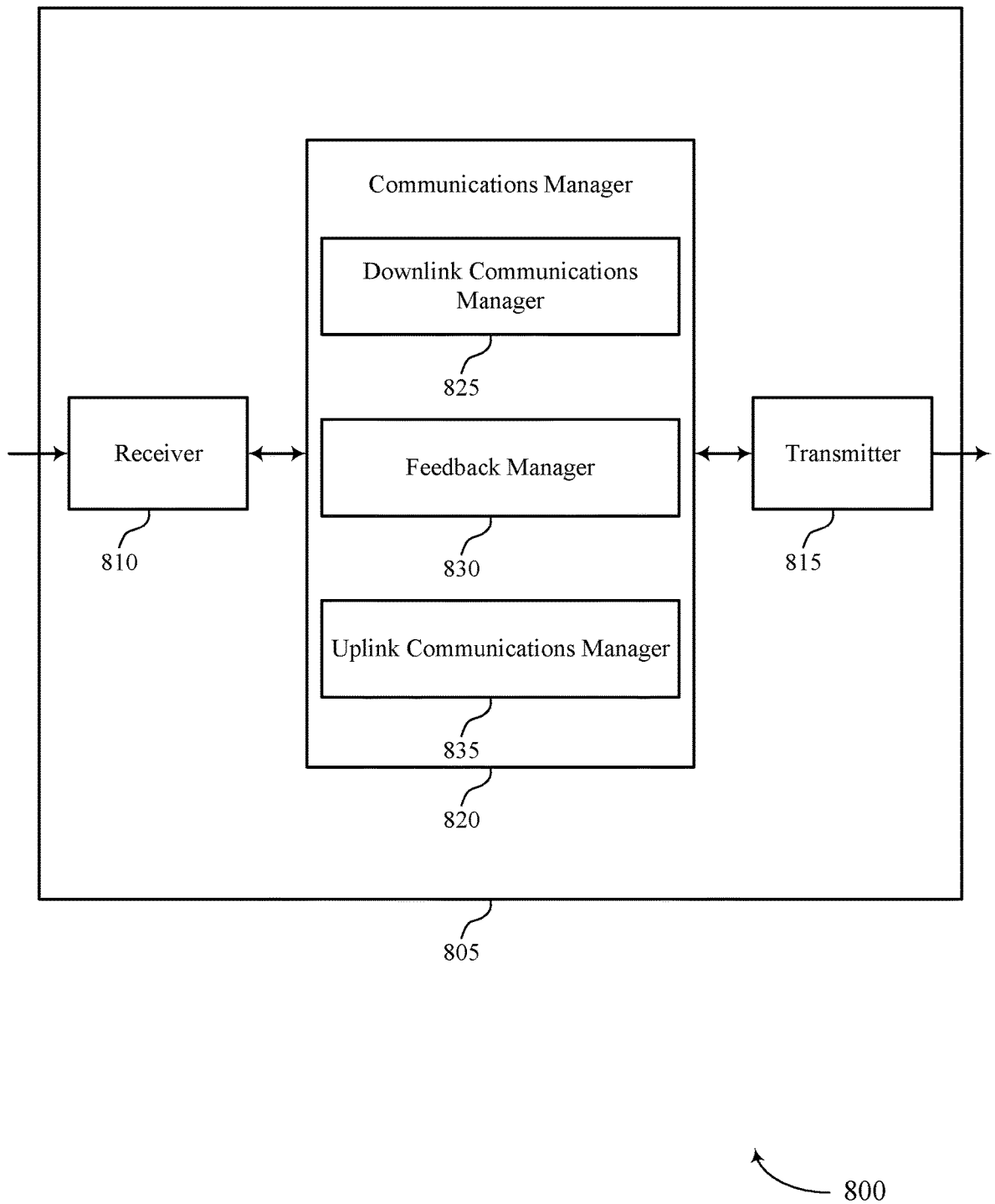

FIG. 8 shows a block diagram 800 of a device 805 that supports feedback techniques in wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include one or more processors. Each of these components may be in communication with one another (e.g., via one or more buses).

The receiver 810 may provide a means for receiving information such as packets, user data, control information, or any combination thereof associated with various information channels (e.g., control channels, data channels, information channels related to feedback techniques in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to feedback techniques in wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of feedback techniques in wireless communications as described herein. For example, the communications manager 820 may include a downlink communications manager 825, a feedback manager 830, an uplink communications manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The downlink communications manager 825 may be configured as or otherwise support a means for monitoring for a set of multiple downlink transmissions from a base station that are associated with a set of feedback processes. The feedback manager 830 may be configured as or otherwise support a means for generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission. The uplink communications manager 835 may be configured as or otherwise support a means for transmitting, to the base station, a feedback message that includes the feedback report and an indication of a number of negative-acknowledgments of the feedback report that are due to unsuccessful receipt of data channel transmissions.

In some cases, the downlink communications manager 825, feedback manager 830, and the uplink communications manager 835 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the downlink communications manager 825, feedback manager 830, and the uplink communications manager 835 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
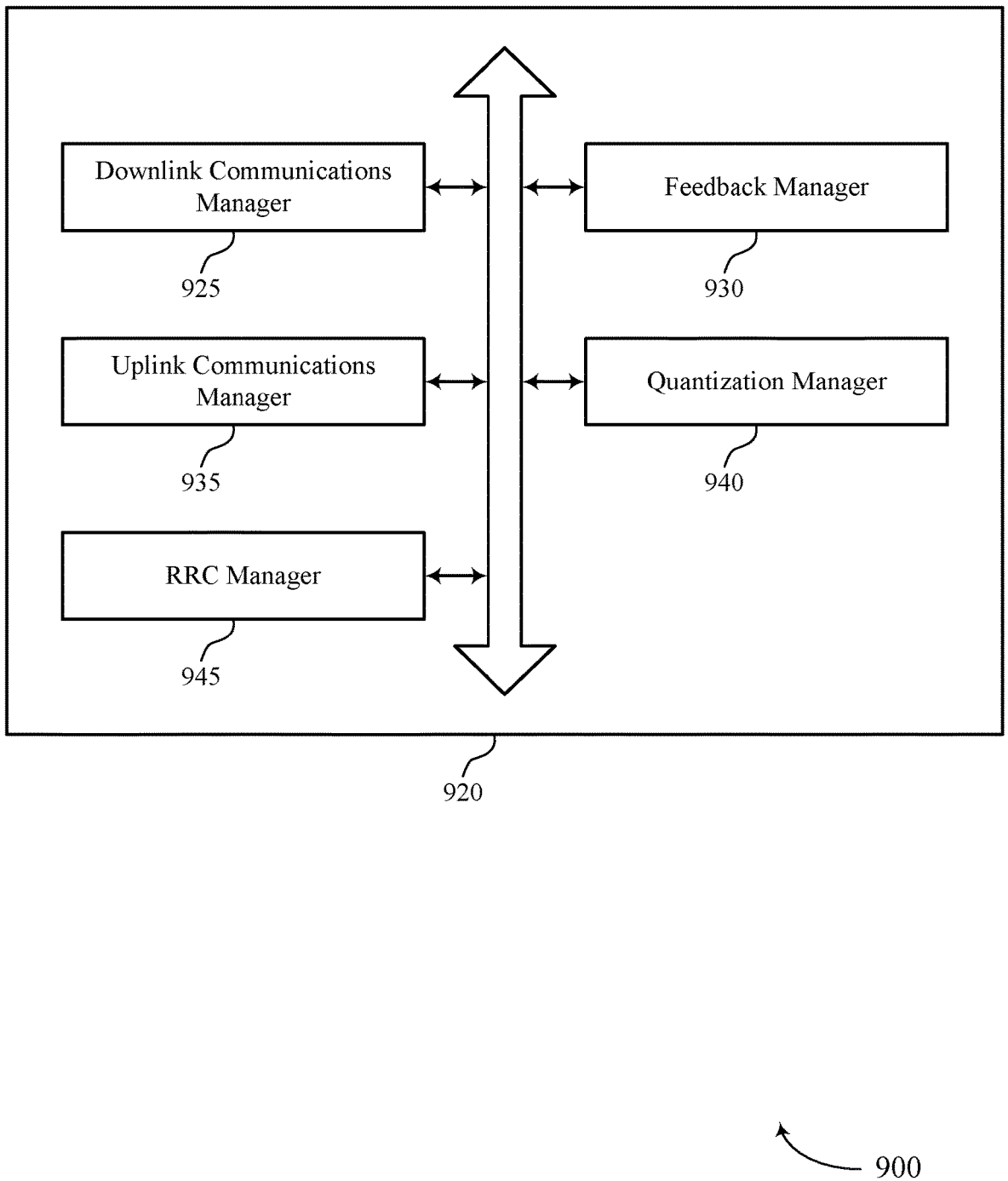
FIG. 9 shows a block diagram of a communications manager that supports feedback techniques in wireless communications in accordance with aspects of the present disclosure.

FIG. 9 shows a block diagram 900 of a communications manager 920 that supports feedback techniques in wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of feedback techniques in wireless communications as described herein. For example, the communications manager 920 may include a downlink communications manager 925, a feedback manager 930, an uplink communications manager 935, a quantization manager 940, an RRC manager 945, or any combination thereof. Each of these components may communicate, directly or indirectly, with one another (e.g., via one or more buses).

The communications manager 920 may support wireless communication at a UE in accordance with examples as disclosed herein. The downlink communications manager 925 may be configured as or otherwise support a means for monitoring for a set of multiple downlink transmissions from a base station that are associated with a set of feedback processes. The feedback manager 930 may be configured as or otherwise support a means for generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission. The uplink communications manager 935 may be configured as or otherwise support a means for transmitting, to the base station, a feedback message that includes the feedback report and an indication of a number of negative-acknowledgments of the feedback report that are due to unsuccessful receipt of data channel transmissions.

In some examples, the indication of the number of negative-acknowledgments provides the number of negative-acknowledgments in a number of bits that is determined based on a number of feedback indications that are included in the feedback report. In some examples, the indication of the number of negative-acknowledgments is a quantized indication with a linear quantization of an amount of negative-acknowledgments due to unsuccessful receipt of data channel transmissions that can be included in the feedback report.

In some examples, the RRC manager 945 may be configured as or otherwise support a means for receiving, from the base station, control signaling that provides a number of bits for the indication of the number of negative-acknowledgments due to unsuccessful receipt of data channel transmissions.

In some examples, the quantization manager 940 may be configured as or otherwise support a means for determining the amount of negative-acknowledgments associated with each quantization point based on the number of bits and a number of feedback indications in the feedback report. In some examples, the control signaling further indicates a quantization granularity for each quantization point of a set of quantization points. In some examples, a last quantization point of the set of quantization points includes all remaining amounts of negative-acknowledgments due to unsuccessful receipt of data channel transmissions that can be included in the feedback report that are not quantized by prior quantization points. In some examples, the indication of the number of negative-acknowledgments is a quantized indication with a non-linear quantization of an amount of negative-acknowledgments due to unsuccessful receipt of data channel transmissions that can be included in the feedback report. In some examples, the non-linear quantization is a logarithmic quantization in which successive quantization points indicate increasing amounts of negative-acknowledgments according to an exponential function.

In some examples, a first subset of a set of quantization points provide a first granularity of a first amount of negative-acknowledgments and a second subset of the set of quantization points provide a second granularity of a second amount of negative-acknowledgments, and where the first amount of negative-acknowledgments is less than the second amount of negative-acknowledgments. In some examples, a first subset of a set of quantization points provide linear quantization and a second subset of the set of quantization points provide non-linear quantization.

In some cases, the downlink communications manager 925, the feedback manager 930, the uplink communications manager 935, the quantization manager 940, and the RRC manager 945, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the downlink communications manager 925, the feedback manager 930, the uplink communications manager 935, the quantization manager 940, and the RRC manager 945 discussed herein.

Figure 10:
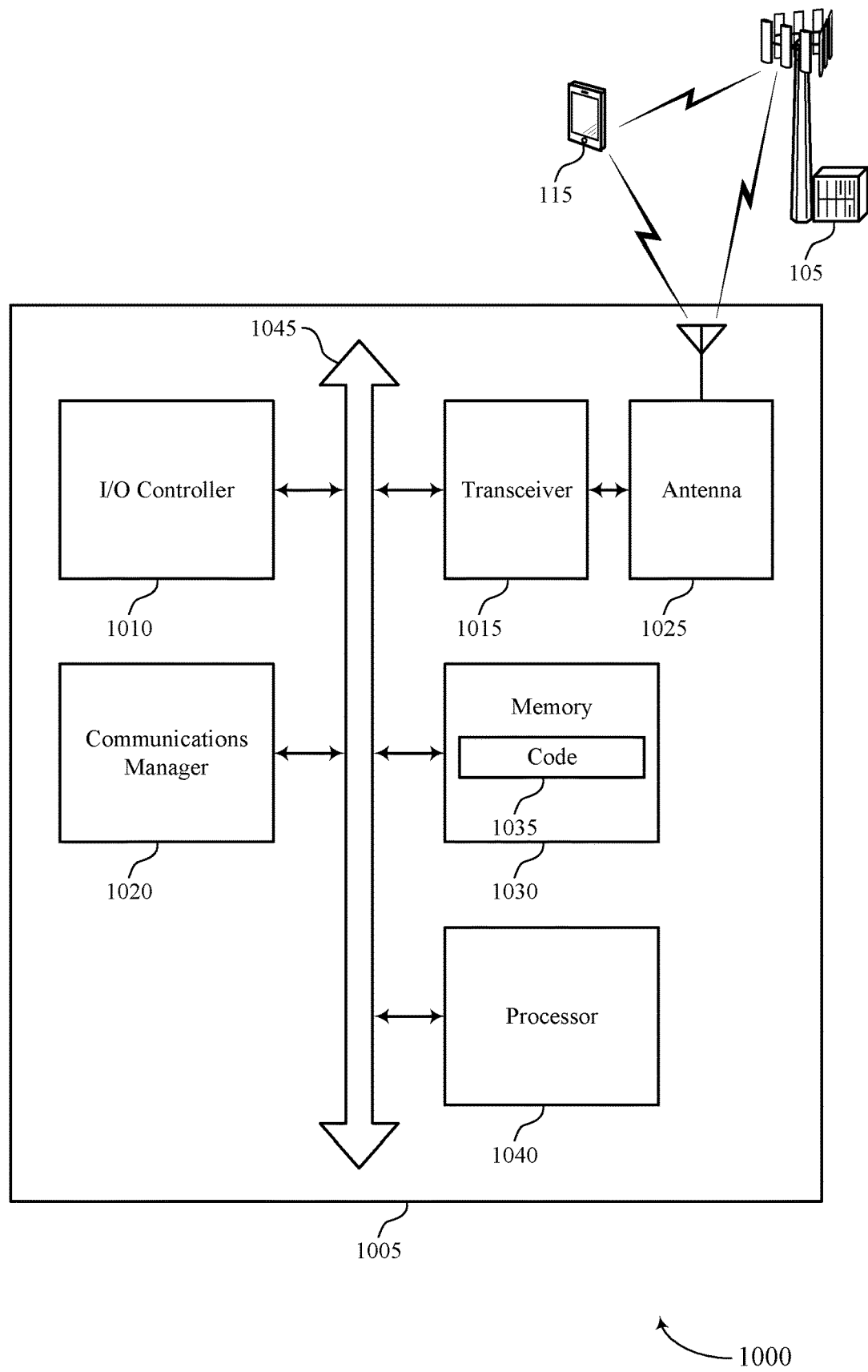
FIG. 10 shows a diagram of a system including a device that supports feedback techniques in wireless communications in accordance with aspects of the present disclosure.

FIG. 10 shows a diagram of a system 1000 including a device 1005 that supports feedback techniques in wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting feedback techniques in wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for monitoring for a set of multiple downlink transmissions from a base station that are associated with a set of feedback processes. The communications manager 1020 may be configured as or otherwise support a means for generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission. The communications manager 1020 may be configured as or otherwise support a means for transmitting, to the base station, a feedback message that includes the feedback report and an indication of a number of negative-acknowledgments of the feedback report that are due to unsuccessful receipt of data channel transmissions.

By including or configuring the communications manager 1020 in accordance with examples as described herein, the device 1005 may support techniques for increased reliability for downlink communications (e.g., PDCCH and PDSCH transmissions), and also provide for power savings and reduced processing resource usage through reduction in a number of retransmissions due to enhanced adjustment of control or data channels that may have poor channel quality.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of feedback techniques in wireless communications as described herein, or the processor 1040 and the memory 1030 may be otherwise configured to perform or support such operations.

Figure 11:
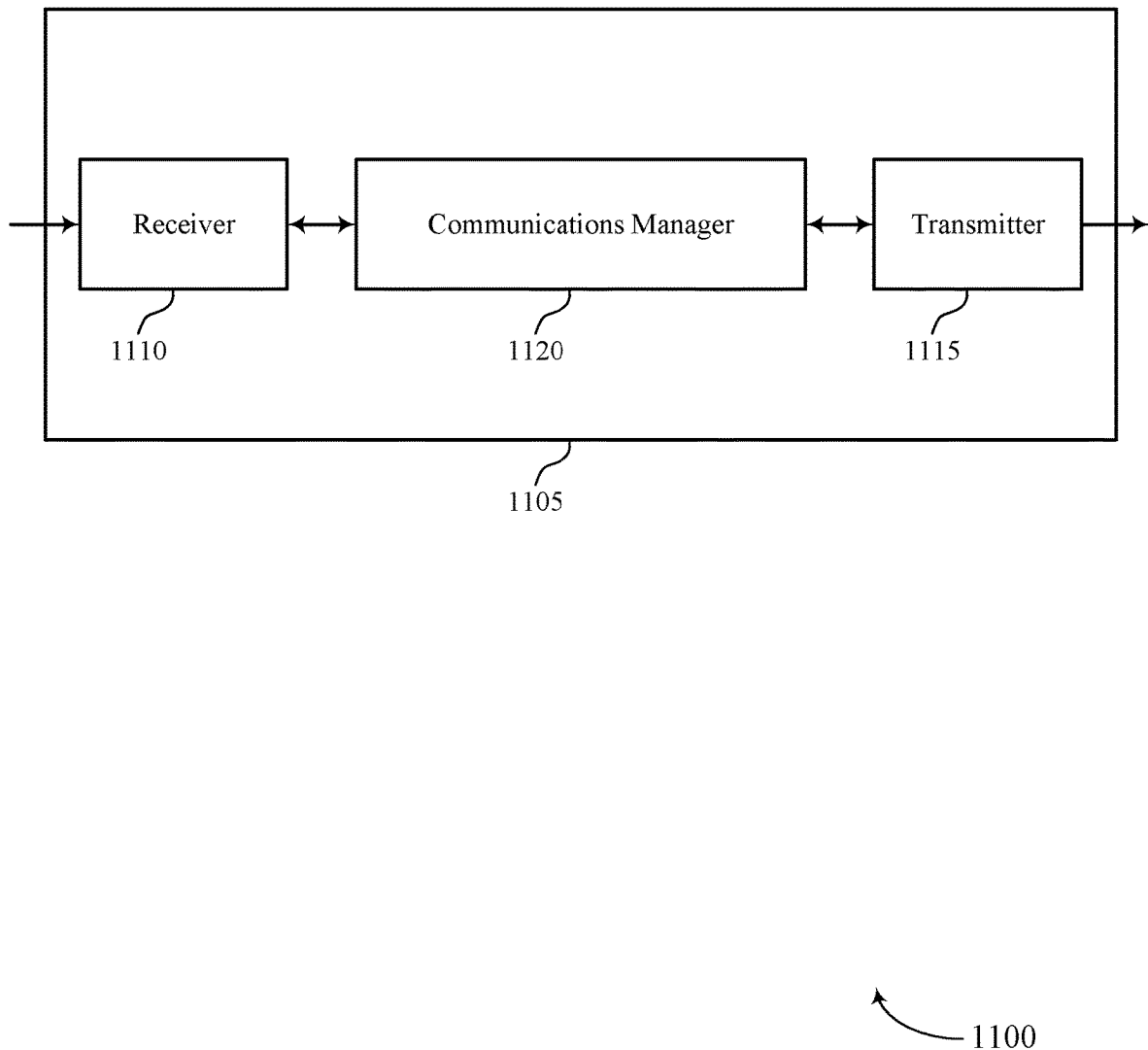
FIGS. 11 and 12 show block diagrams of devices that support feedback techniques in wireless communications in accordance with aspects of the present disclosure.

FIG. 11 shows a block diagram 1100 of a device 1105 that supports feedback techniques in wireless communications in accordance with aspects of the present disclosure. The device 1105 may be an example of aspects of a base station 105 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the feedback techniques discussed herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to feedback techniques in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to feedback techniques in wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of feedback techniques in wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, a set of multiple downlink transmissions that are associated with a set of feedback processes, where each downlink transmission has an associated control channel transmission and an associated data channel transmission. The communications manager 1120 may be configured as or otherwise support a means for receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions. The communications manager 1120 may be configured as or otherwise support a means for retransmitting one or more of the set of multiple downlink transmissions based on the feedback message.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for increased reliability for downlink communications (e.g., PDCCH and PDSCH transmissions), and also provide for power savings and reduced processing resource usage through reduction in a number of retransmissions due to enhanced adjustment of control or data channels that may have poor channel quality.

Figure 12:
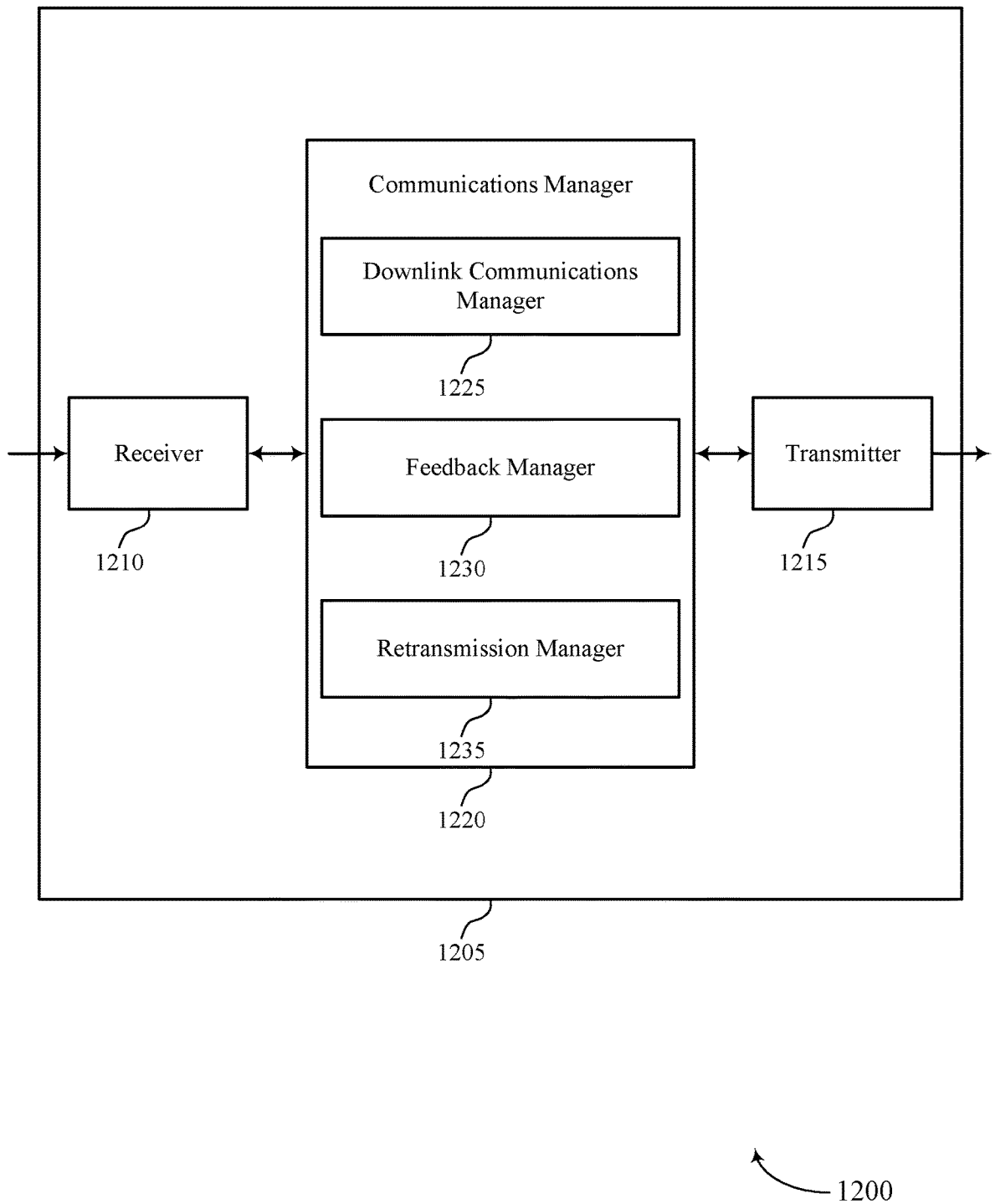

FIG. 12 shows a block diagram 1200 of a device 1205 that supports feedback techniques in wireless communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to feedback techniques in wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to feedback techniques in wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of feedback techniques in wireless communications as described herein. For example, the communications manager 1220 may include a downlink communications manager 1225, a feedback manager 1230, a retransmission manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The downlink communications manager 1225 may be configured as or otherwise support a means for transmitting, to a UE, a set of multiple downlink transmissions that are associated with a set of feedback processes, where each downlink transmission has an associated control channel transmission and an associated data channel transmission. The feedback manager 1230 may be configured as or otherwise support a means for receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions. The retransmission manager 1235 may be configured as or otherwise support a means for retransmitting one or more of the set of multiple downlink transmissions based on the feedback message.

In some cases, the downlink communications manager 1225, the feedback manager 1230, and the retransmission manager 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the downlink communications manager 1225, the feedback manager 1230, and the retransmission manager 1235 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
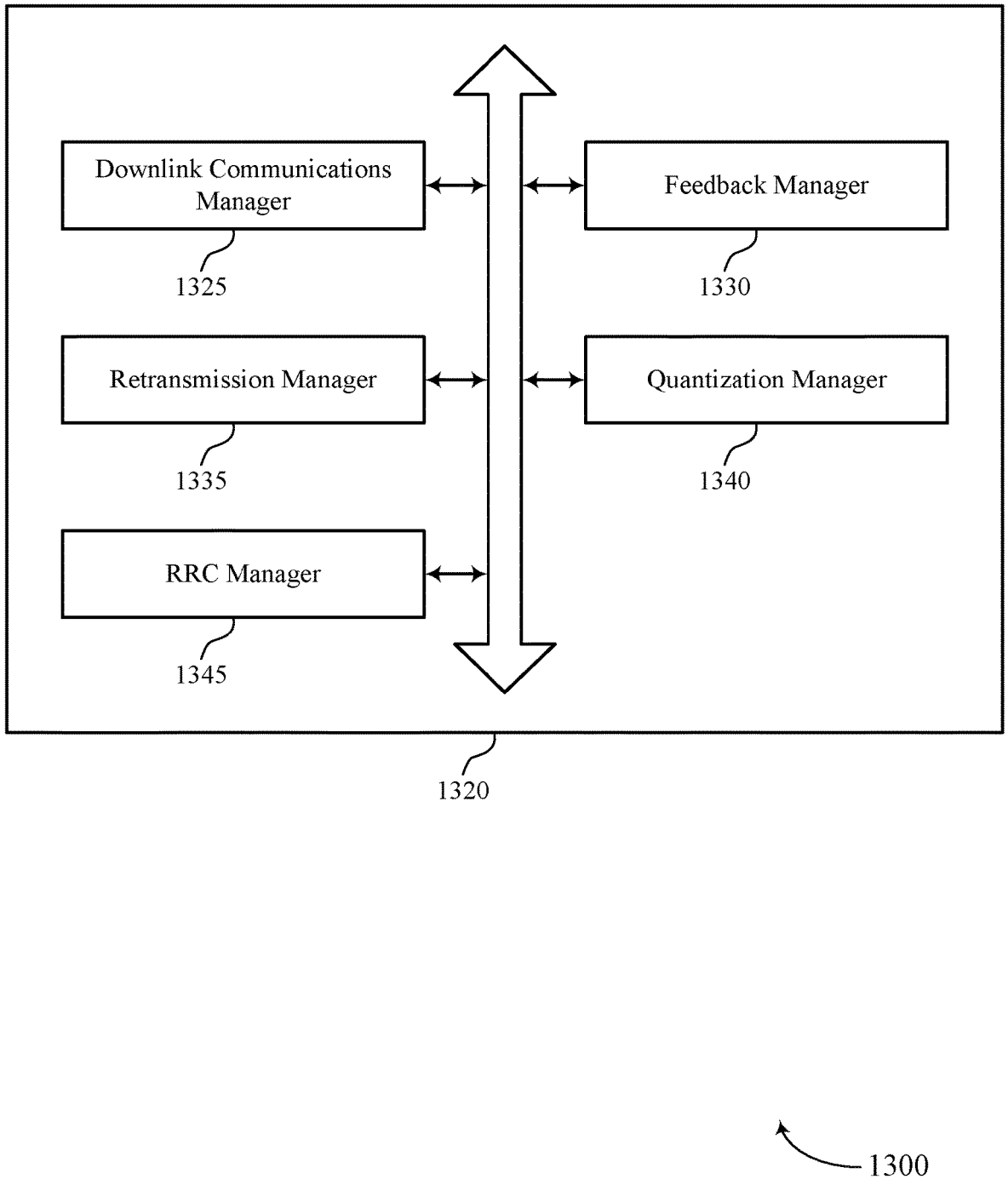
FIG. 13 shows a block diagram of a communications manager that supports feedback techniques in wireless communications in accordance with aspects of the present disclosure.

FIG. 13 shows a block diagram 1300 of a communications manager 1320 that supports feedback techniques in wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of feedback techniques in wireless communications as described herein. For example, the communications manager 1320 may include a downlink communications manager 1325, a feedback manager 1330, a retransmission manager 1335, a quantization manager 1340, an RRC manager 1345, or any combination thereof. Each of these components may communicate, directly or indirectly, with one another (e.g., via one or more buses).

The communications manager 1320 may support wireless communication at a base station in accordance with examples as disclosed herein. The downlink communications manager 1325 may be configured as or otherwise support a means for transmitting, to a UE, a set of multiple downlink transmissions that are associated with a set of feedback processes, where each downlink transmission has an associated control channel transmission and an associated data channel transmission. The feedback manager 1330 may be configured as or otherwise support a means for receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions. The retransmission manager 1335 may be configured as or otherwise support a means for retransmitting one or more of the set of multiple downlink transmissions based on the feedback message.

In some examples, the indication of the number of negative-acknowledgments provides the number of negative-acknowledgments in a number of bits that is determined based on a number of feedback indications that are included in the feedback report. In some examples, the indication of the number of negative-acknowledgments is a quantized indication with a linear quantization of an amount of negative-acknowledgments due to unsuccessful receipt of data channel transmissions that can be included in the feedback report.

In some examples, the RRC manager 1345 may be configured as or otherwise support a means for transmitting, to the UE, control signaling that provides a number of bits for the indication of the number of negative-acknowledgments due to unsuccessful receipt of data channel transmissions. In some examples, the control signaling further indicates a quantization granularity for each quantization point of a set of quantization points.

In some examples, the quantization manager 1340 may be configured as or otherwise support a means for determining the amount of negative-acknowledgments associated with each quantization point based on the number of bits and a number of feedback indications in the feedback report. In some examples, a last quantization point of the set of quantization points includes all remaining amounts of negative-acknowledgments due to unsuccessful receipt of data channel transmissions that can be included in the feedback report that are not quantized by prior quantization points.

In some examples, the indication of the number of negative-acknowledgments is a quantized indication with a non-linear quantization of an amount of negative-acknowledgments that can be included in the feedback report. In some examples, the non-linear quantization is a logarithmic quantization in which successive quantization points indicate increasing amounts of negative-acknowledgments according to an exponential function.

In some examples, a first subset of a set of quantization points provide a first granularity of a first amount of negative-acknowledgments and a second subset of the set of quantization points provide a second granularity of a second amount of negative-acknowledgments, and where the first amount of negative-acknowledgments is less than the second amount of negative-acknowledgments. In some examples, a first subset of a set of quantization points provide linear quantization and a second subset of the set of quantization points provide non-linear quantization.

In some cases, the downlink communications manager 1325, the feedback manager 1330, the retransmission manager 1335, the quantization manager 1340, and the RRC manager 1345, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the downlink communications manager 1325, the feedback manager 1330, the retransmission manager 1335, the quantization manager 1340, and the RRC manager 1345 discussed herein.

Figure 14:
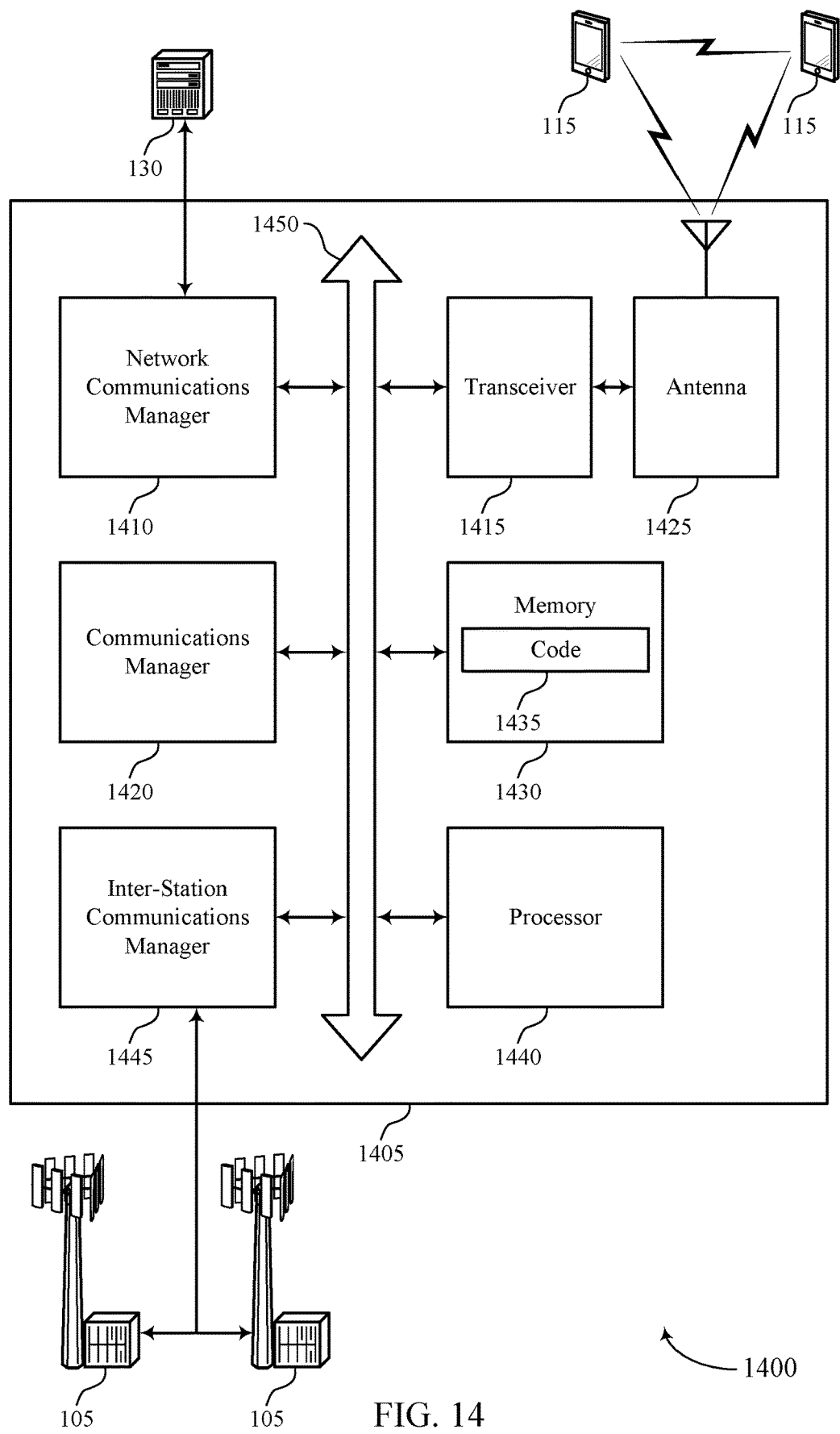
FIG. 14 shows a diagram of a system including a device that supports feedback techniques in wireless communications in accordance with aspects of the present disclosure.

FIG. 14 shows a diagram of a system 1400 including a device 1405 that supports feedback techniques in wireless communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting feedback techniques in wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, a set of multiple downlink transmissions that are associated with a set of feedback processes, where each downlink transmission has an associated control channel transmission and an associated data channel transmission. The communications manager 1420 may be configured as or otherwise support a means for receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions. The communications manager 1420 may be configured as or otherwise support a means for retransmitting one or more of the set of multiple downlink transmissions based on the feedback message.

By including or configuring the communications manager 1420 in accordance with examples as described herein, the device 1405 may support techniques for increased reliability for downlink communications (e.g., PDCCH and PDSCH transmissions), and also provide for power savings and reduced processing resource usage through reduction in a number of retransmissions due to enhanced adjustment of control or data channels that may have poor channel quality.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of feedback techniques in wireless communications as described herein, or the processor 1440 and the memory 1430 may be otherwise configured to perform or support such operations.

Figure 15:
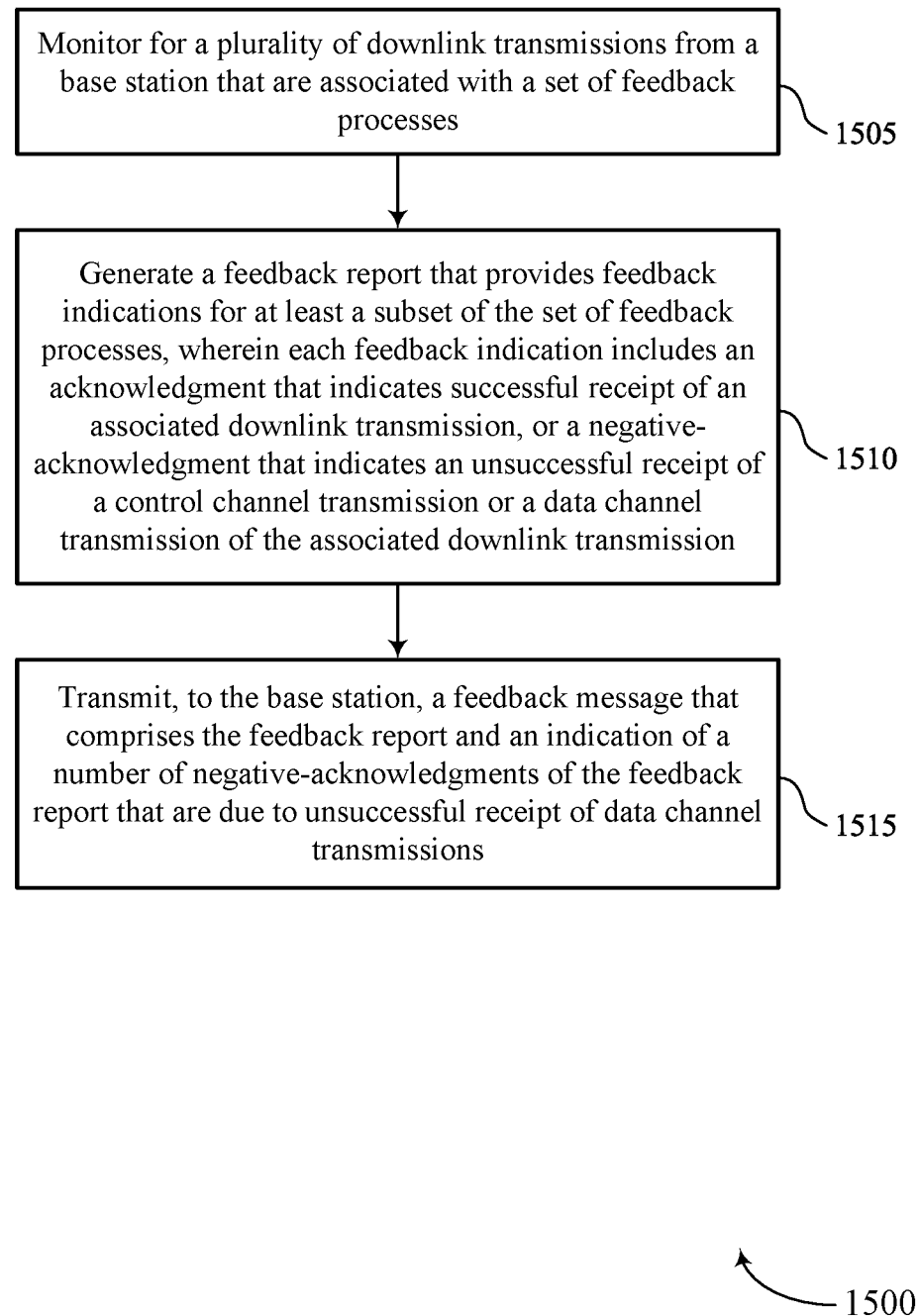
FIGS. 15 through 18 show flowcharts illustrating methods that support feedback techniques in wireless communications in accordance with aspects of the present disclosure.

FIG. 15 shows a flowchart illustrating a method 1500 that supports feedback techniques in wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include monitoring for a set of multiple downlink transmissions from a base station that are associated with a set of feedback processes. The operations of 1505 may be performed in accordance with examples as disclosed herein. In some examples, aspects of the operations of 1505 may be performed by a downlink communications manager 925 as described with reference to FIG. 9.

At 1510, the method may include generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission. The operations of 1510 may be performed in accordance with examples as disclosed herein. In some examples, aspects of the operations of 1510 may be performed by a feedback manager 930 as described with reference to FIG. 9.

At 1515, the method may include transmitting, to the base station, a feedback message that includes the feedback report and an indication of a number of negative-acknowledgments of the feedback report that are due to unsuccessful receipt of data channel transmissions. The operations of 1515 may be performed in accordance with examples as disclosed herein. In some examples, aspects of the operations of 1515 may be performed by an uplink communications manager 935 as described with reference to FIG. 9.

Figure 16:
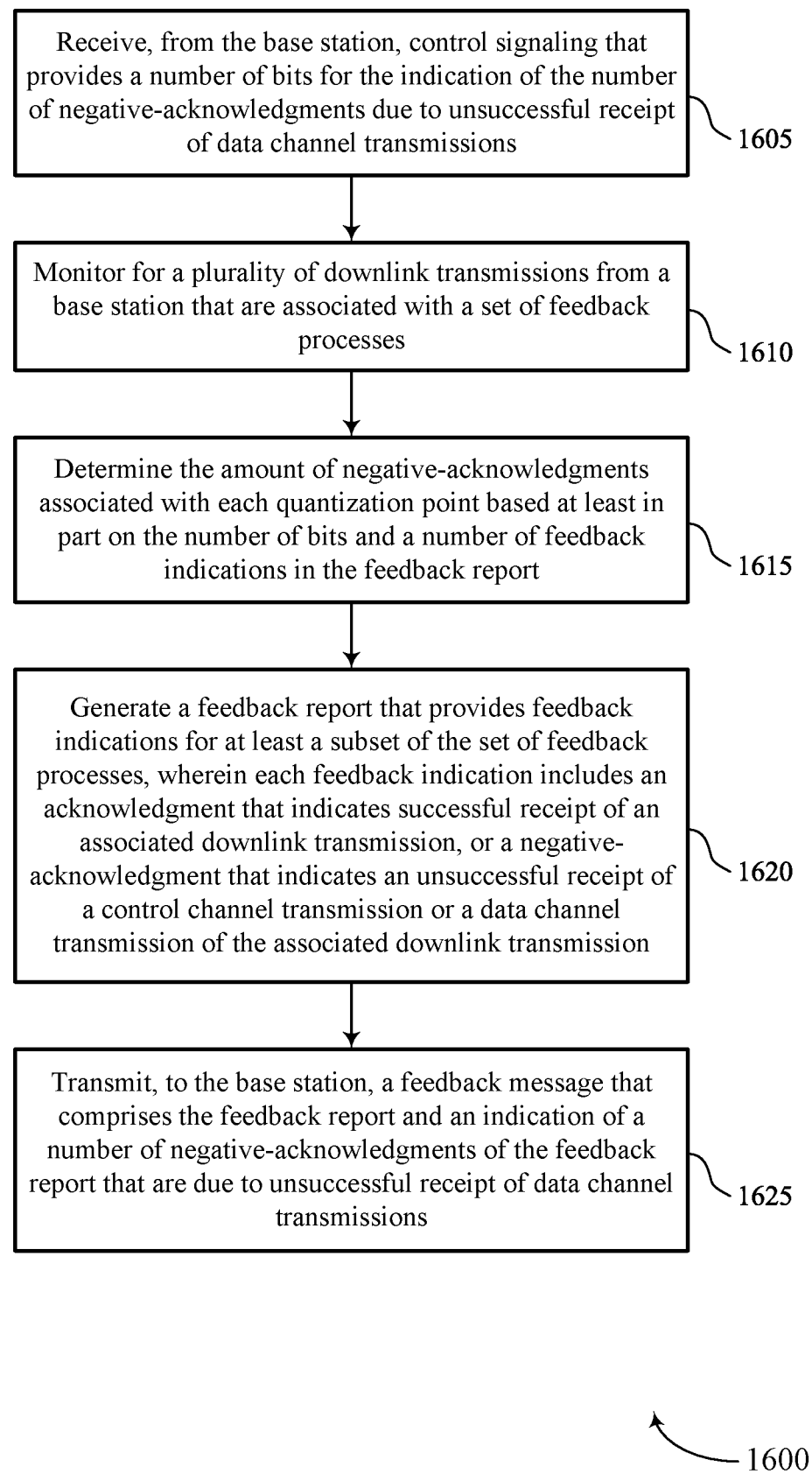

FIG. 16 shows a flowchart illustrating a method 1600 that supports feedback techniques in wireless communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from the base station, control signaling that provides a number of bits for the indication of the number of negative-acknowledgments due to unsuccessful receipt of data channel transmissions. The operations of 1605 may be performed in accordance with examples as disclosed herein. In some examples, aspects of the operations of 1605 may be performed by an RRC manager 945 as described with reference to FIG. 9. In some cases, the control signaling may indicate a quantization granularity for each quantization point of a set of quantization points.

At 1610, the method may include monitoring for a set of multiple downlink transmissions from a base station that are associated with a set of feedback processes. The operations of 1610 may be performed in accordance with examples as disclosed herein. In some examples, aspects of the operations of 1610 may be performed by a downlink communications manager 925 as described with reference to FIG. 9.

At 1615, the method may include determining the amount of negative-acknowledgments associated with each quantization point based on the number of bits and a number of feedback indications in the feedback report. The operations of 1615 may be performed in accordance with examples as disclosed herein. In some examples, aspects of the operations of 1615 may be performed by a quantization manager 940 as described with reference to FIG. 9.

At 1620, the method may include generating a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of a control channel transmission or a data channel transmission of the associated downlink transmission. The operations of 1620 may be performed in accordance with examples as disclosed herein. In some examples, aspects of the operations of 1620 may be performed by a feedback manager 930 as described with reference to FIG. 9.

At 1625, the method may include transmitting, to the base station, a feedback message that includes the feedback report and an indication of a number of negative-acknowledgments of the feedback report that are due to unsuccessful receipt of data channel transmissions. The operations of 1625 may be performed in accordance with examples as disclosed herein. In some examples, aspects of the operations of 1625 may be performed by an uplink communications manager 935 as described with reference to FIG. 9. In some cases, the indication of the number of negative-acknowledgments may be a quantized indication with a linear quantization of an amount of negative-acknowledgments due to unsuccessful receipt of data channel transmissions that can be included in the feedback report. In some cases, a last quantization point of the set of quantization points including all remaining amounts of negative-acknowledgments due to unsuccessful receipt of data channel transmissions that can be included in the feedback report that are not quantized by prior quantization points.

Figure 17:
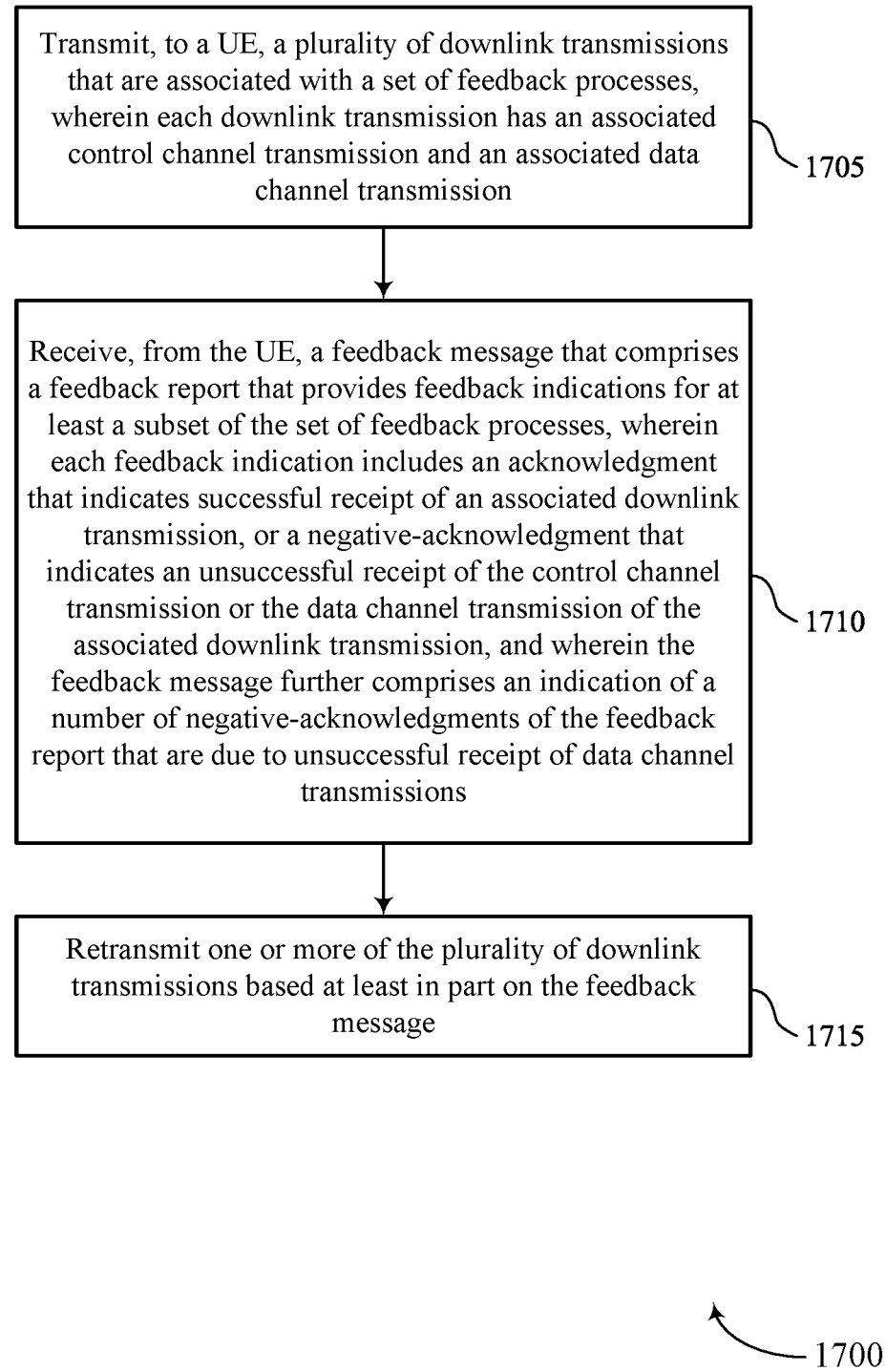

FIG. 17 shows a flowchart illustrating a method 1700 that supports feedback techniques in wireless communications in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a set of multiple downlink transmissions that are associated with a set of feedback processes, where each downlink transmission has an associated control channel transmission and an associated data channel transmission. The operations of 1705 may be performed in accordance with examples as disclosed herein. In some examples, aspects of the operations of 1705 may be performed by a downlink communications manager 1325 as described with reference to FIG. 13.

At 1710, the method may include receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions. The operations of 1710 may be performed in accordance with examples as disclosed herein. In some examples, aspects of the operations of 1710 may be performed by a feedback manager 1330 as described with reference to FIG. 13.

At 1715, the method may include retransmitting one or more of the set of multiple downlink transmissions based on the feedback message. The operations of 1715 may be performed in accordance with examples as disclosed herein. In some examples, aspects of the operations of 1715 may be performed by a retransmission manager 1335 as described with reference to FIG. 13.

Figure 18:
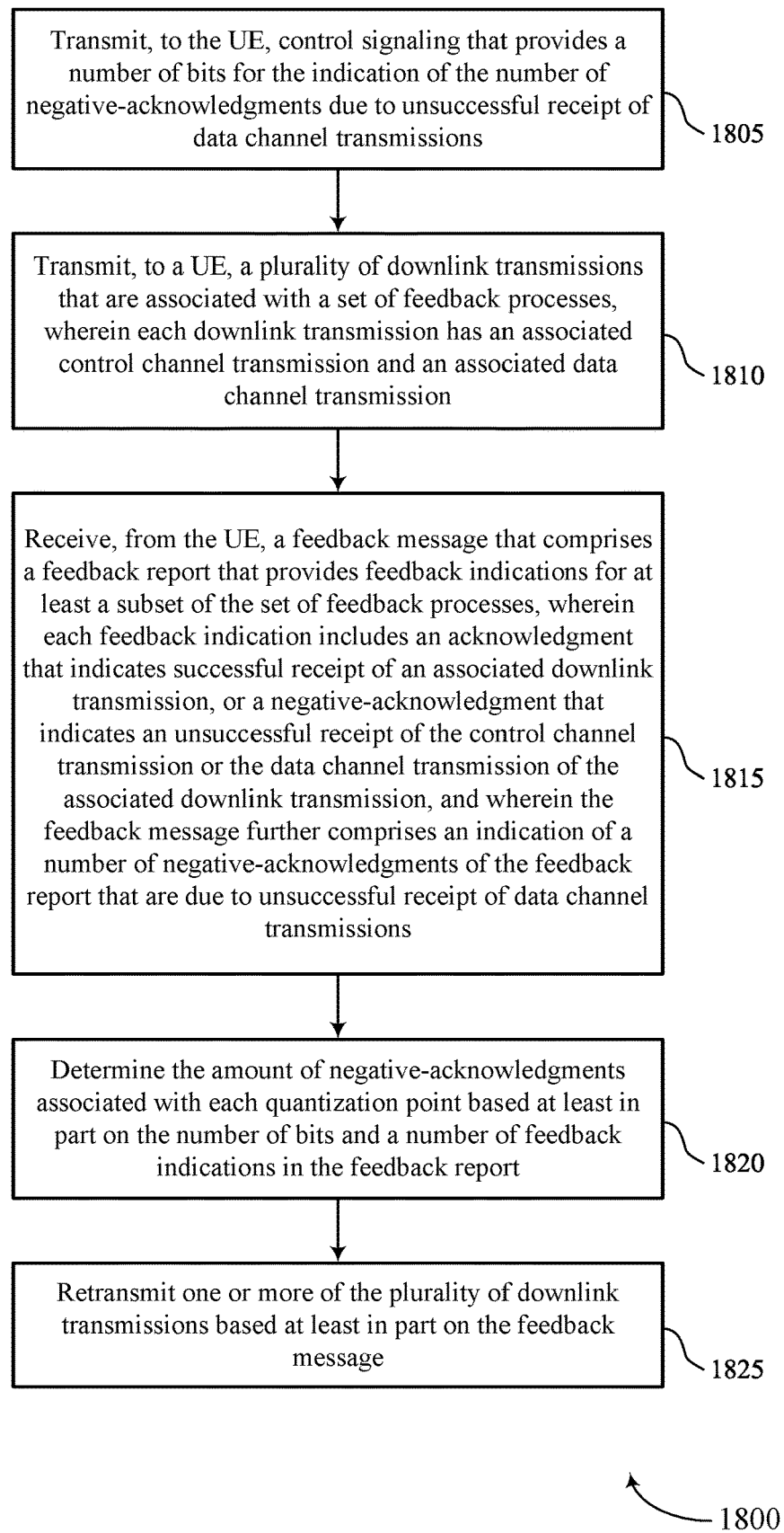

FIG. 18 shows a flowchart illustrating a method 1800 that supports feedback techniques in wireless communications in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to the UE, control signaling that provides a number of bits for the indication of the number of negative-acknowledgments due to unsuccessful receipt of data channel transmissions. The operations of 1805 may be performed in accordance with examples as disclosed herein. In some examples, aspects of the operations of 1805 may be performed by an RRC manager 1345 as described with reference to FIG. 13. In some cases, the indication of the number of negative-acknowledgments is a quantized indication with a linear, non-linear, or mixed linear and non-linear quantization of an amount of negative-acknowledgments due to unsuccessful receipt of data channel transmissions that can be included in the feedback report.

At 1810, the method may include transmitting, to a UE, a set of multiple downlink transmissions that are associated with a set of feedback processes, where each downlink transmission has an associated control channel transmission and an associated data channel transmission. The operations of 1810 may be performed in accordance with examples as disclosed herein. In some examples, aspects of the operations of 1810 may be performed by a downlink communications manager 1325 as described with reference to FIG. 13.

At 1815, the method may include receiving, from the UE, a feedback message that includes a feedback report that provides feedback indications for at least a subset of the set of feedback processes, where each feedback indication includes an acknowledgment that indicates successful receipt of an associated downlink transmission, or a negative-acknowledgment that indicates an unsuccessful receipt of the control channel transmission or the data channel transmission of the associated downlink transmission, and where the feedback message further includes an indication of a number of negative-acknowledgments of the feedback report that are due to unsuccessful receipt of data channel transmissions. The operations of 1815 may be performed in accordance with examples as disclosed herein. In some examples, aspects of the operations of 1815 may be performed by a feedback manager 1330 as described with reference to FIG. 13.

At 1820, the method may include determining the amount of negative-acknowledgments associated with each quantization point based on the number of bits and a number of feedback indications in the feedback report. The operations of 1820 may be performed in accordance with examples as disclosed herein. In some examples, aspects of the operations of 1820 may be performed by a quantization manager 1340 as described with reference to FIG. 13.

At 1825, the method may include retransmitting one or more of the set of multiple downlink transmissions based on the feedback message. The operations of 1825 may be performed in accordance with examples as disclosed herein. In some examples, aspects of the operations of 1825 may be performed by a retransmission manager 1335 as described with reference to FIG. 13.

The following provides an overview of aspects of the present disclosure:

Aspect 1: A method for wireless communication at a UE, comprising: monitoring for a plurality of downlink transmissions from a base station that are associated with a set of feedback processes; generating a feedback report that provides feedback indications for at least a subset of the set of feedback processes, wherein each feedback indication includes an acknowledgment that indicates successful receipt of an associated downlink transmission, or a negative-acknowledgment that indicates an unsuccessful receipt of a control channel transmission or a data channel transmission of the associated downlink transmission; and transmitting, to the base station, a feedback message that comprises the feedback report and an indication of a number of negative-acknowledgments of the feedback report that are due to unsuccessful receipt of data channel transmissions.

Aspect 2: The method of aspect 1, wherein the indication of the number of negative-acknowledgments provides the number of negative-acknowledgments in a number of bits that is determined based on a number of feedback indications that are included in the feedback report.

Aspect 3: The method of any of aspects 1 through 2, wherein the indication of the number of negative-acknowledgments is a quantized indication with a linear quantization of an amount of negative-acknowledgments due to unsuccessful receipt of data channel transmissions that can be included in the feedback report.

Aspect 4: The method of aspect 3, further comprising: receiving, from the base station, control signaling that provides a number of bits for the indication of the number of negative-acknowledgments due to unsuccessful receipt of data channel transmissions.

Aspect 5: The method of aspect 4, further comprising: determining the amount of negative-acknowledgments associated with each quantization point based at least in part on the number of bits and a number of feedback indications in the feedback report.

Aspect 6: The method of any of aspects 4 through 5, wherein the control signaling further indicates a quantization granularity for each quantization point of a set of quantization points.

Aspect 7: The method of aspect 6, wherein a last quantization point of the set of quantization points includes all remaining amounts of negative-acknowledgments due to unsuccessful receipt of data channel transmissions that can be included in the feedback report that are not quantized by prior quantization points.

Aspect 8: The method of aspect 1, wherein the indication of the number of negative-acknowledgments is a quantized indication with a non-linear quantization of an amount of negative-acknowledgments due to unsuccessful receipt of data channel transmissions that can be included in the feedback report.

Aspect 9: The method of aspect 8, wherein a first subset of a set of quantization points provide a first granularity of a first amount of negative-acknowledgments and a second subset of the set of quantization points provide a second granularity of a second amount of negative-acknowledgments, and wherein the first amount of negative-acknowledgments is less than the second amount of negative-acknowledgments.

Aspect 10: The method of any of aspects 8 through 9, wherein the non-linear quantization is a logarithmic quantization in which successive quantization points indicate increasing amounts of negative-acknowledgments according to an exponential function.

Aspect 11: The method of any of aspects 8 through 10, wherein a first subset of a set of quantization points provide linear quantization and a second subset of the set of quantization points provide non-linear quantization.

Aspect 12: A method for wireless communication at a base station, comprising: transmitting, to a UE, a plurality of downlink transmissions that are associated with a set of feedback processes, wherein each downlink transmission has an associated control channel transmission and an associated data channel transmission; receiving, from the UE, a feedback message that comprises a feedback report that provides feedback indications for at least a subset of the set of feedback processes, wherein each feedback indication includes an acknowledgment that indicates successful receipt of an associated downlink transmission, or a negative-acknowledgment that indicates an unsuccessful receipt of the control channel transmission or the data channel transmission of the associated downlink transmission, and wherein the feedback message further comprises an indication of a number of negative-acknowledgments of the feedback report that are due to unsuccessful receipt of data channel transmissions; and retransmitting one or more of the plurality of downlink transmissions based at least in part on the feedback message.

Aspect 13: The method of aspect 12, wherein the indication of the number of negative-acknowledgments provides the number of negative-acknowledgments in a number of bits that is determined based on a number of feedback indications that are included in the feedback report.

Aspect 14: The method of any of aspects 12 through 13, wherein the indication of the number of negative-acknowledgments is a quantized indication with a linear quantization of an amount of negative-acknowledgments due to unsuccessful receipt of data channel transmissions that can be included in the feedback report.

Aspect 15: The method of aspect 14, further comprising: transmitting, to the UE, control signaling that provides a number of bits for the indication of the number of negative-acknowledgments due to unsuccessful receipt of data channel transmissions.

Aspect 16: The method of aspect 15, further comprising: determining the amount of negative-acknowledgments associated with each quantization point based at least in part on the number of bits and a number of feedback indications in the feedback report.

Aspect 17: The method of any of aspects 15 through 16, wherein the control signaling further indicates a quantization granularity for each quantization point of a set of quantization points.

Aspect 18: The method of aspect 17, wherein a last quantization point of the set of quantization points includes all remaining amounts of negative-acknowledgments due to unsuccessful receipt of data channel transmissions that can be included in the feedback report that are not quantized by prior quantization points.

Aspect 19: The method of aspect 12, wherein the indication of the number of negative-acknowledgments is a quantized indication with a non-linear quantization of an amount of negative-acknowledgments that can be included in the feedback report.

Aspect 20: The method of aspect 19, wherein a first subset of a set of quantization points provide a first granularity of a first amount of negative-acknowledgments and a second subset of the set of quantization points provide a second granularity of a second amount of negative-acknowledgments, and wherein the first amount of negative-acknowledgments is less than the second amount of negative-acknowledgments.

Aspect 21: The method of any of aspects 19 through 20, wherein the non-linear quantization is a logarithmic quantization in which successive quantization points indicate increasing amounts of negative-acknowledgments according to an exponential function.

Aspect 22: The method of any of aspects 19 through 21, wherein a first subset of a set of quantization points provide linear quantization and a second subset of the set of quantization points provide non-linear quantization.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a base station, comprising a processor; memory coupled with the processor; and instructions stored in the memory and executable by the processor to cause the apparatus to perform a method of any of aspects 12 through 22.

Aspect 27: An apparatus for wireless communication at a base station, comprising at least one means for performing a method of any of aspects 12 through 22.

Aspect 28: A non-transitory computer-readable medium storing code for wireless communication at a base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    monitoring for a plurality of downlink transmissions from a base station that are associated with a set of feedback processes;
    generating a feedback report that comprises a first set of bits corresponding to one or more feedback indications for at least a subset of the set of feedback processes, wherein each feedback indication of the feedback report includes an acknowledgment bit that indicates successful receipt of an associated downlink transmission, or a negative-acknowledgment bit that indicates an unsuccessful receipt of a control channel transmission or a data channel transmission of the associated downlink transmission; and
    transmitting, to the base station, a feedback message that comprises the first set of bits comprising the feedback report and a second set of bits comprising an indication of a number of the negative-acknowledgments reported by the feedback indications that are due to unsuccessful receipt of data channel transmissions.

2. The method of claim 1, wherein the indication of the number of the negative-acknowledgments provides the number of the negative-acknowledgments in a number of bits that is determined based on a number of feedback indications that are included in the feedback report.

3. The method of claim 1, wherein the indication of the number of the negative-acknowledgments is a quantized indication with a linear quantization of an amount of the negative-acknowledgments due to unsuccessful receipt of data channel transmissions that can be included in the feedback report.

4. The method of claim 3, further comprising:
    receiving, from the base station, control signaling that provides a number of bits for the indication of the number of the negative-acknowledgments due to unsuccessful receipt of data channel transmissions.

5. The method of claim 4, further comprising:
    determining the amount of the negative-acknowledgments associated with each quantization point based at least in part on the number of bits and a number of feedback indications in the feedback report.

6. The method of claim 4, wherein the control signaling further indicates a quantization granularity for each quantization point of a set of quantization points.

7. The method of claim 6, wherein a last quantization point of the set of quantization points includes all remaining amounts of the negative-acknowledgments due to unsuccessful receipt of data channel transmissions that can be included in the feedback report that are not quantized by prior quantization points.

8. The method of claim 1, wherein the indication of the number of the negative-acknowledgments is a quantized indication with a non-linear quantization of an amount of the negative-acknowledgments due to unsuccessful receipt of data channel transmissions that can be included in the feedback report.

9. The method of claim 8, wherein a first subset of a set of quantization points provide a first granularity of a first amount of the negative-acknowledgments and a second subset of the set of quantization points provide a second granularity of a second amount of the negative-acknowledgments, and wherein the first amount of the negative-acknowledgments is less than the second amount of the negative-acknowledgments.

10. The method of claim 8, wherein the non-linear quantization is a logarithmic quantization in which successive quantization points indicate increasing amounts of the negative-acknowledgments according to an exponential function.

11. The method of claim 8, wherein a first subset of a set of quantization points provide linear quantization and a second subset of the set of quantization points provide non-linear quantization.

12. A method for wireless communication at a base station, comprising:
transmitting, to a user equipment (UE), a plurality of downlink transmissions that are associated with a set of feedback processes, wherein each downlink transmission has an associated control channel transmission and an associated data channel transmission;
receiving, from the UE, a feedback message that comprises a first set of bits comprising a feedback report, the first set of bits corresponding to one or more feedback indications for at least a subset of the set of feedback processes, wherein each feedback indication of the feedback report includes an acknowledgment bit that indicates successful receipt of an associated downlink transmission, or a negative-acknowledgment bit that indicates an unsuccessful receipt of the control channel transmission or the data channel transmission of the associated downlink transmission, and wherein the feedback message further comprises a second set of bits comprising an indication of a number of the negative-acknowledgments reported by the feedback indications that are due to unsuccessful receipt of data channel transmissions; and
retransmitting one or more of the plurality of downlink transmissions based at least in part on the feedback message.

13. The method of claim 12, wherein the indication of the number of the negative-acknowledgments provides the number of the negative-acknowledgments in a number of bits that is determined based on a number of feedback indications that are included in the feedback report.

14. The method of claim 12, wherein the indication of the number of the negative-acknowledgments is a quantized indication with a linear quantization of an amount of the negative-acknowledgments due to unsuccessful receipt of data channel transmissions that can be included in the feedback report.

15. The method of claim 14, further comprising:
transmitting, to the UE, control signaling that provides a number of bits for the indication of the number of the negative-acknowledgments due to unsuccessful receipt of data channel transmissions.

16. The method of claim 15, further comprising:
determining the amount of the negative-acknowledgments associated with each quantization point based at least in part on the number of bits and a number of feedback indications in the feedback report.

17. The method of claim 15, wherein the control signaling further indicates a quantization granularity for each quantization point of a set of quantization points.

18. The method of claim 17, wherein a last quantization point of the set of quantization points includes all remaining amounts of the negative-acknowledgments due to unsuccessful receipt of data channel transmissions that can be included in the feedback report that are not quantized by prior quantization points.

19. The method of claim 12, wherein the indication of the number of the negative-acknowledgments is a quantized indication with a non-linear quantization of an amount of the negative-acknowledgments that can be included in the feedback report.

20. The method of claim 19, wherein a first subset of a set of quantization points provide a first granularity of a first amount of the negative-acknowledgments and a second subset of the set of quantization points provide a second granularity of a second amount of the negative-acknowledgments, and wherein the first amount of the negative-acknowledgments is less than the second amount of the negative-acknowledgments.

21. The method of claim 19, wherein the non-linear quantization is a logarithmic quantization in which successive quantization points indicate increasing amounts of the negative-acknowledgments according to an exponential function.

22. The method of claim 19, wherein a first subset of a set of quantization points provide linear quantization and a second subset of the set of quantization points provide non-linear quantization.

23. A user equipment (UE) for wireless communications, comprising:
memory; and
one or more processors coupled with the memory and configured to cause the UE to:
monitor for a plurality of downlink transmissions from a base station that are associated with a set of feedback processes;
generate a feedback report that comprises a first set of bits corresponding to one or more feedback indications for at least a subset of the set of feedback processes, wherein each feedback indication of the feedback report includes an acknowledgment bit that indicates successful receipt of an associated downlink transmission, or a negative-acknowledgment bit that indicates an unsuccessful receipt of a control channel transmission or a data channel transmission of the associated downlink transmission; and
transmit, to the base station, a feedback message that comprises the first set of bits comprising the feedback report and a second set of bits comprising an indication of a number of the negative-acknowledgments reported by the feedback indications that are due to unsuccessful receipt of data channel transmissions.

24. The UE of claim 23, wherein the indication of the number of the negative-acknowledgments provides the number of the negative-acknowledgments in a number of bits that is determined based on a number of feedback indications that are included in the feedback report.

25. The UE of claim 23, wherein the indication of the number of the negative-acknowledgments is a quantized indication with a linear quantization of an amount of the negative-acknowledgments due to unsuccessful receipt of data channel transmissions that can be included in the feedback report.

26. The UE of claim 25, wherein the one or more processors are further configured to cause the UE to:
receive, from the base station, control signaling that provides a number of bits for the indication of the number of the negative-acknowledgments due to unsuccessful receipt of data channel transmissions.

27. The UE of claim 26, wherein the one or more processors are further configured to cause the UE to:
determine the amount of the negative-acknowledgments associated with each quantization point based at least in part on the number of bits and a number of feedback indications in the feedback report.

28. A base station for wireless communications, comprising:
memory; and
one or more processors coupled with the memory and configured to cause the base station to:
transmit, to a user equipment (UE), a plurality of downlink transmissions that are associated with a set of feedback processes, wherein each downlink transmission has an associated control channel transmission and an associated data channel transmission;
receive, from the UE, a feedback message that comprises a first set of bits comprising a feedback report, the first set of bits corresponding to one or more feedback indications for at least a subset of the set of feedback processes, wherein each feedback indication of the feedback report includes an acknowledgment bit that indicates successful receipt of an associated downlink transmission, or a negative-acknowledgment bit that indicates an unsuccessful receipt of the control channel transmission or the data channel transmission of the associated downlink transmission, and wherein the feedback message further comprises a second set of bits comprising an indication of a number of the negative-acknowledgments reported by the feedback indications that are due to unsuccessful receipt of data channel transmissions; and
retransmit one or more of the plurality of downlink transmissions based at least in part on the feedback message.

29. The base station of claim 28, wherein the indication of the number of the negative-acknowledgments provides the number of the negative-acknowledgments in a number of bits that is determined based on a number of feedback indications that are included in the feedback report.

30. The base station of claim 28, wherein the indication of the number of the negative-acknowledgments is a quantized indication with a linear quantization of an amount of the negative-acknowledgments due to unsuccessful receipt of data channel 4 transmissions that can be included in the feedback report.

* * * * *